United States Patent
Krupka et al.

(10) Patent No.: US 10,847,162 B2
(45) Date of Patent: Nov. 24, 2020

(54) MULTI-MODAL SPEECH LOCALIZATION

(71) Applicant: Microsoft Technology Licensing, LLC, Redmond, WA (US)

(72) Inventors: Eyal Krupka, Redmond, WA (US); Xiong Xiao, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 16/020,934

(22) Filed: Jun. 27, 2018

(65) Prior Publication Data
US 2019/0341054 A1     Nov. 7, 2019

Related U.S. Application Data

(60) Provisional application No. 62/668,198, filed on May 7, 2018.

(51) Int. Cl.
*G01L 17/00*     (2006.01)
*G06K 9/00*      (2006.01)
(Continued)

(52) U.S. Cl.
CPC ........ *G10L 17/005* (2013.01); *G06K 9/00288* (2013.01); *G06T 7/70* (2017.01);
(Continued)

(58) Field of Classification Search
None
See application file for complete search history.

(56) References Cited

U.S. PATENT DOCUMENTS

| | | | | |
|---|---|---|---|---|
| 6,567,775 B1 * | 5/2003 | Maali | ................... | G06K 9/6293 704/231 |
| 7,305,095 B2 * | 12/2007 | Rui | ........................ | H04R 3/005 381/122 |

(Continued)

OTHER PUBLICATIONS

Anasosalu Pavan KUnnar et al. "Compact and Accurate 3-D Face Modeling Using an RGB-D Camera: Lets Open the Door to 3-D Video Conference", 2013 IEEE International Oonference on Computer Vision Workshoops, IEEE, Dec. 2, 2013 (Dec. 2, 2013), pp. 67-74.*

(Continued)

*Primary Examiner* — Thuykhanh Le
(74) *Attorney, Agent, or Firm* — Alleman Hall Creasman & Tuttle LLP

(57) ABSTRACT

Multi-modal speech localization is achieved using image data captured by one or more cameras, and audio data captured by a microphone array. Audio data captured by each microphone of the array is transformed to obtain a frequency domain representation that is discretized in a plurality of frequency intervals. Image data captured by each camera is used to determine a positioning of each human face. Input data is provided to a previously-trained, audio source localization classifier, including: the frequency domain representation of the audio data captured by each microphone, and the positioning of each human face captured by each camera in which the positioning of each human face represents a candidate audio source. An identified audio source is indicated by the classifier based on the input data that is estimated to be the human face from which the audio data originated.

20 Claims, 13 Drawing Sheets

(51) Int. Cl.
*G10L 25/84* (2013.01)
*G10L 21/0232* (2013.01)
*G06T 7/70* (2017.01)
*H04R 1/40* (2006.01)
*G10L 17/18* (2013.01)
*H04N 5/247* (2006.01)
*G10L 17/00* (2013.01)

(52) U.S. Cl.
CPC .......... G10L 21/0232 (2013.01); G10L 25/84 (2013.01); *G06T 2207/30201* (2013.01); *G10L 17/18* (2013.01); *H04N 5/247* (2013.01); *H04R 1/406* (2013.01)

(56) References Cited

U.S. PATENT DOCUMENTS

| | | | | |
|---|---|---|---|---|
| 9,101,299 | B2* | 8/2015 | Anderson | H04R 25/70 |
| 2003/0163320 | A1* | 8/2003 | Yamazaki | G10L 13/033 |
| | | | | 704/270 |
| 2003/0185410 | A1* | 10/2003 | June | H04R 3/005 |
| | | | | 381/94.1 |
| 2004/0104702 | A1* | 6/2004 | Nakadai | G06T 1/0014 |
| | | | | 318/568.12 |
| 2004/0267521 | A1* | 12/2004 | Cutler | G10L 25/78 |
| | | | | 704/202 |
| 2006/0224382 | A1* | 10/2006 | Taneda | G10L 21/0208 |
| | | | | 704/233 |
| 2008/0111887 | A1* | 5/2008 | Cooper | 348/194 |
| 2008/0260212 | A1* | 10/2008 | Moskal | G06K 9/00315 |
| | | | | 382/118 |
| 2008/0292279 | A1* | 11/2008 | Kamada | G06F 16/7844 |
| | | | | 386/244 |
| 2010/0150360 | A1* | 6/2010 | Beaucoup | H04R 3/005 |
| | | | | 381/58 |
| 2010/0303254 | A1* | 12/2010 | Yoshizawa | G01S 3/8083 |
| | | | | 381/92 |
| 2011/0096939 | A1* | 4/2011 | Ichimura | G10L 25/84 |
| | | | | 381/74 |
| 2011/0208521 | A1* | 8/2011 | McClain | G10L 17/26 |
| | | | | 704/233 |
| 2011/0285807 | A1* | 11/2011 | Feng | H04N 5/232 |
| | | | | 348/14.08 |
| 2012/0078624 | A1* | 3/2012 | Yook | G10L 25/78 |
| | | | | 704/233 |
| 2012/0078625 | A1* | 3/2012 | Stokes | G10L 25/48 |
| | | | | 704/233 |
| 2012/0162470 | A1* | 6/2012 | Kim | G06K 9/00281 |
| | | | | 348/231.2 |
| 2012/0162471 | A1* | 6/2012 | Sekiya | G10L 21/0208 |
| | | | | 348/231.4 |
| 2012/0197644 | A1* | 8/2012 | Nagano | G10L 15/1807 |
| | | | | 704/254 |
| 2013/0218559 | A1* | 8/2013 | Yamabe | G10L 21/0216 |
| | | | | 704/226 |
| 2013/0282373 | A1* | 10/2013 | Visser | G10L 21/0316 |
| | | | | 704/233 |
| 2014/0379332 | A1* | 12/2014 | Rodriguez | G10L 17/12 |
| | | | | 704/219 |
| 2015/0112681 | A1* | 4/2015 | Tanaka | G10L 15/32 |
| | | | | 704/249 |
| 2015/0269420 | A1* | 9/2015 | Kim | H04L 67/10 |
| | | | | 382/118 |
| 2016/0064000 | A1* | 3/2016 | Mizumoto | G06K 9/4647 |
| | | | | 704/233 |
| 2016/0179831 | A1* | 6/2016 | Gruber | G06F 16/958 |
| | | | | 704/235 |
| 2017/0270930 | A1* | 9/2017 | Ozmeral | H04M 3/56 |
| 2018/0020285 | A1* | 1/2018 | Zass | G10L 17/26 |
| 2018/0248124 | A1* | 8/2018 | Mujica-Fernaud | H01L 51/0052 |
| 2018/0249124 | A1* | 8/2018 | Tangeland | G06K 9/00228 |
| 2019/0007623 | A1* | 1/2019 | Wang | H04N 5/23299 |
| 2019/0253801 | A1* | 8/2019 | Arteaga | H04R 3/12 |

OTHER PUBLICATIONS

Anasosalu, et al., "Compact and Accurate 3-D Face Modeling Using an RGB-D Camera: Let's Open the Door to 3-D Video Conference", In Proceedings of the IEEE International Conference on Computer Vision (ICCV) Workshops, Dec. 1, 2013, pp. 67-74.

"International Search Report and Written Opinion Issued in PCT Application No. PCT/US19/029769", dated Jul. 25, 2019, 12 Pages.

* cited by examiner

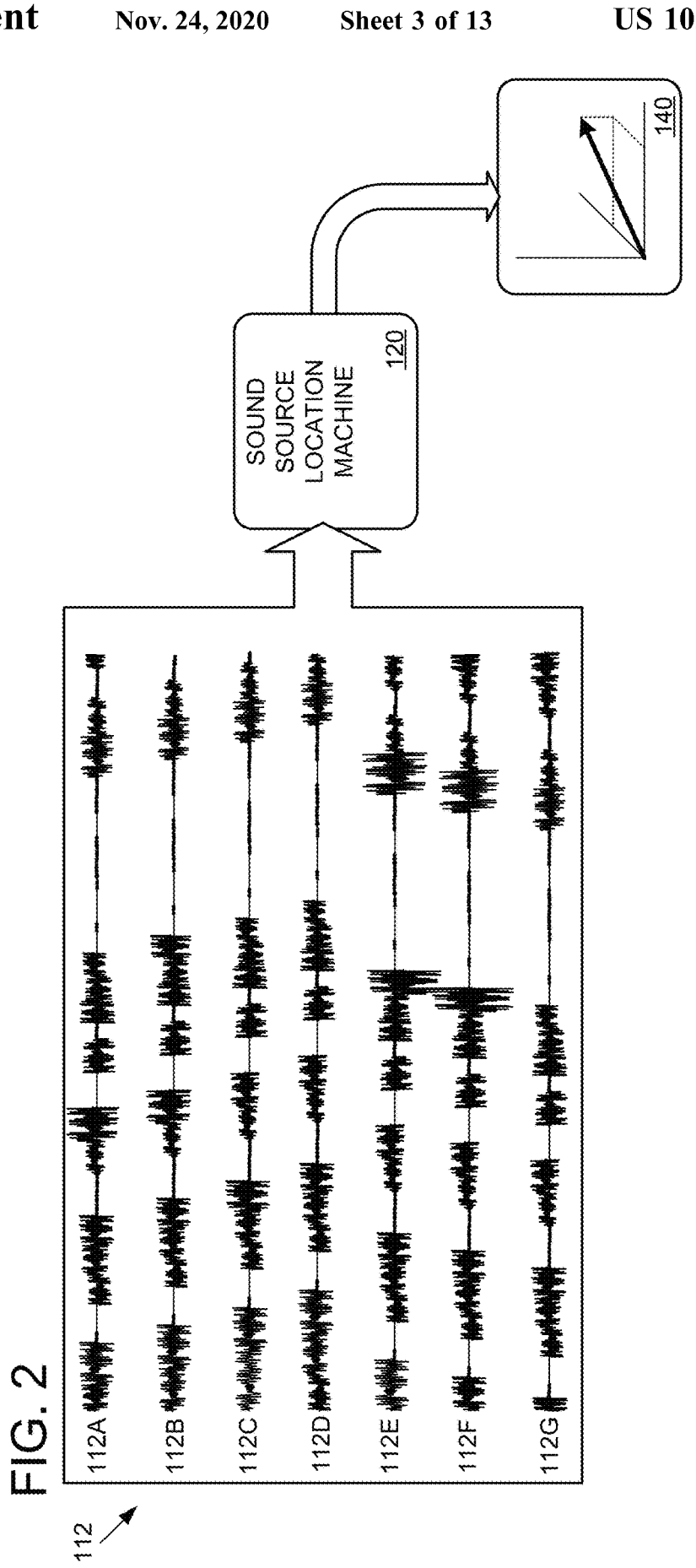

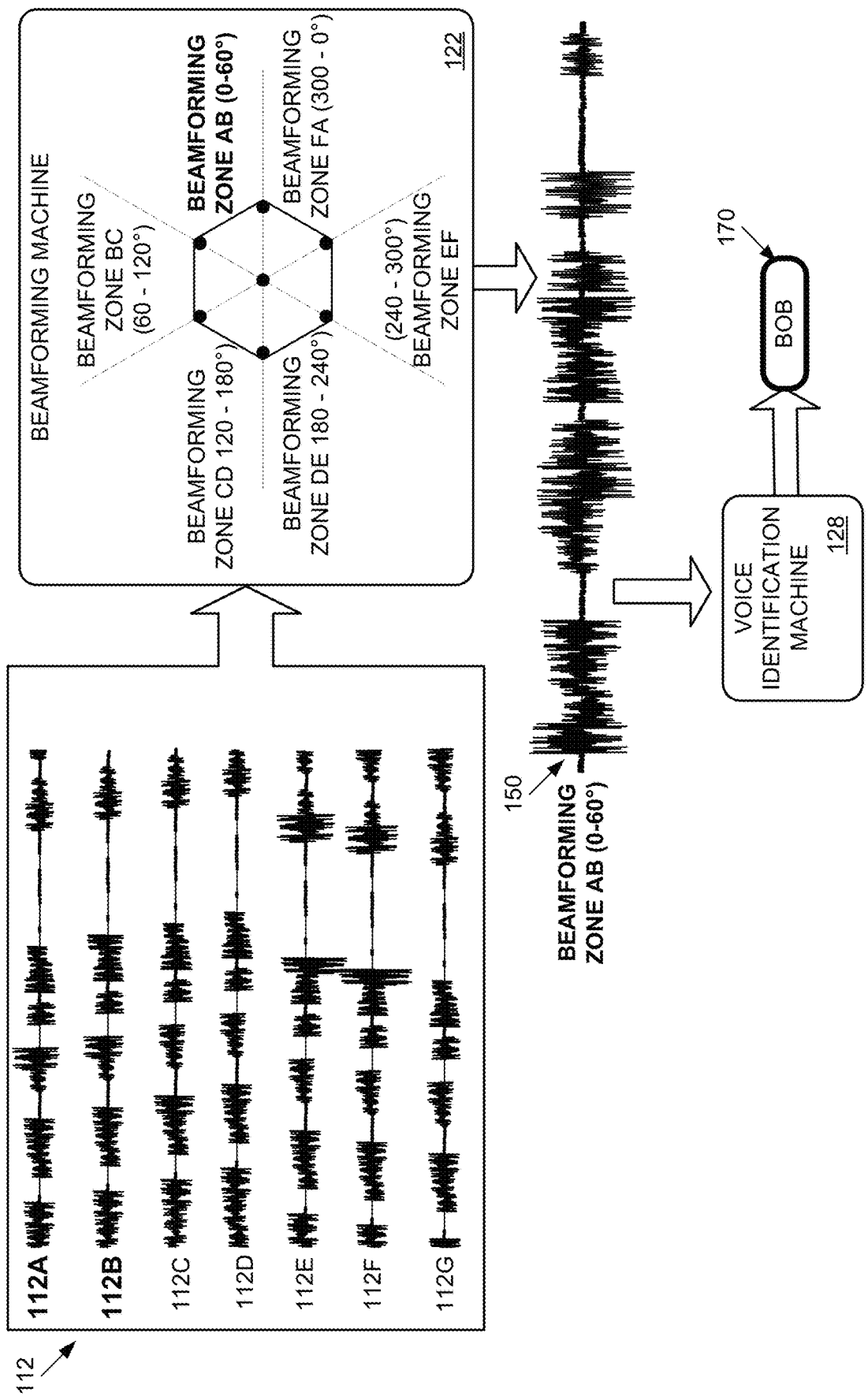

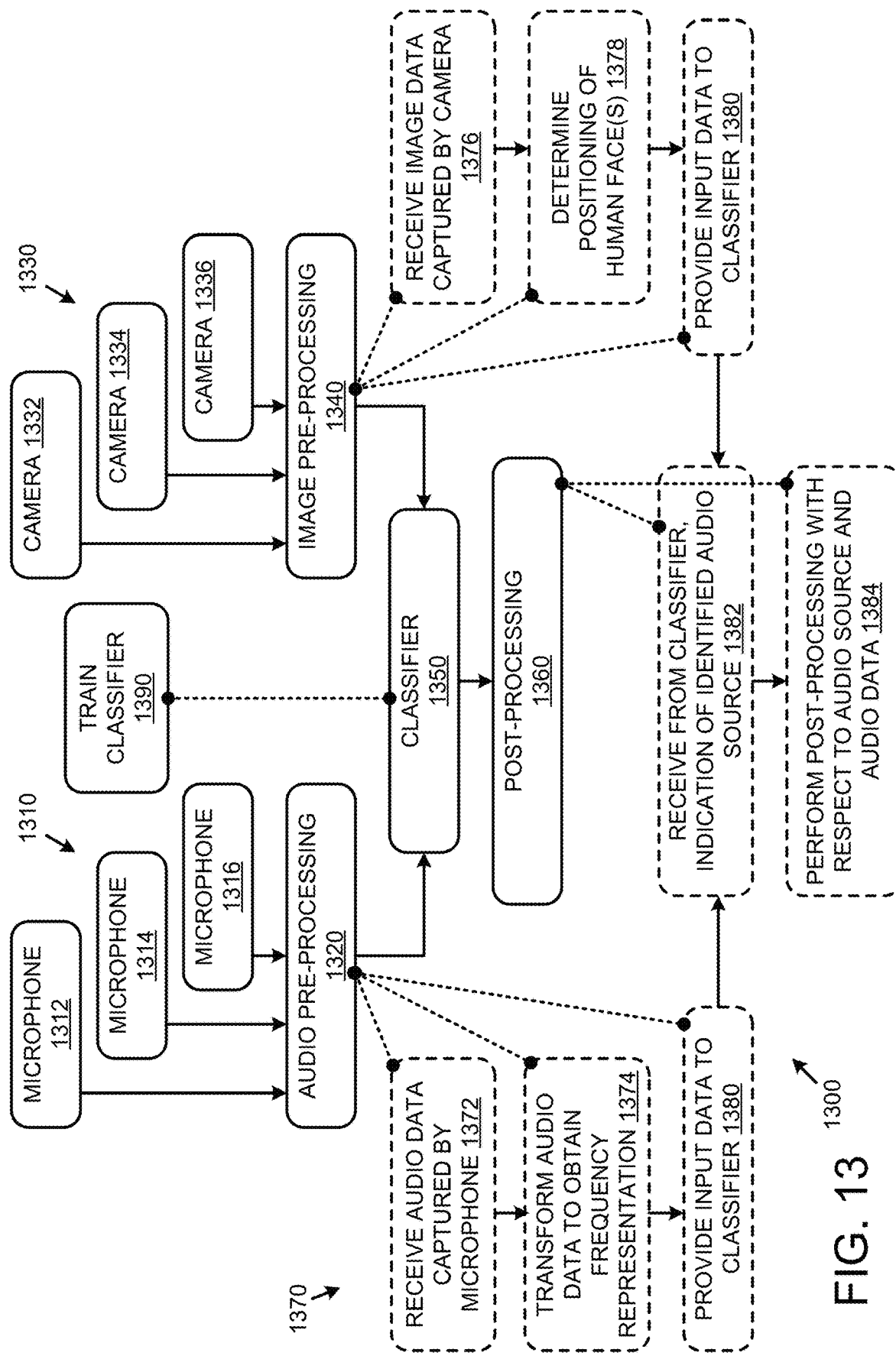

MULTI-MODAL SPEECH LOCALIZATION

CROSS REFERENCE TO RELATED APPLICATIONS

This application claims priority to U.S. Provisional Patent Application Ser. No. 62/668,198, filed May 7, 2018, the entirety of which is hereby incorporated herein by reference for all purposes.

BACKGROUND

Human speech may be converted to text using machine learning technologies. However, in environments that include two or more speakers, state-of-the-art speech recognizers are unable to reliably associate speech with the correct speaker.

SUMMARY

Multi-modal speech localization is achieved using image data captured by one or more cameras, and audio data captured by a microphone array of two or more microphones. Audio data captured by each microphone of the array is transformed to obtain a frequency domain representation that is discretized in a plurality of frequency intervals. Image data captured by each camera is used to determine a positioning of each human face observed within an environment, including a position and an orientation of the face. Input data is provided to a previously-trained, audio source localization classifier, including: the frequency domain representation of the audio data captured by each microphone, and the positioning of each human face captured by each camera in which the positioning of each human face represents a candidate audio source. An identified audio source is indicated by the classifier as an output that is based on the input data. The identified audio source is estimated by the classifier to be the human face from which sound represented by the audio data originated.

BRIEF DESCRIPTION OF THE DRAWINGS

FIG. 2 schematically shows analysis of sound signals by a sound source localization machine.

FIG. 3 schematically shows beamforming of sound signals by a beamforming machine.

FIG. 13 is a flow diagram depicting an example processing pipeline including an associated method.

DETAILED DESCRIPTION

Figure 1B:
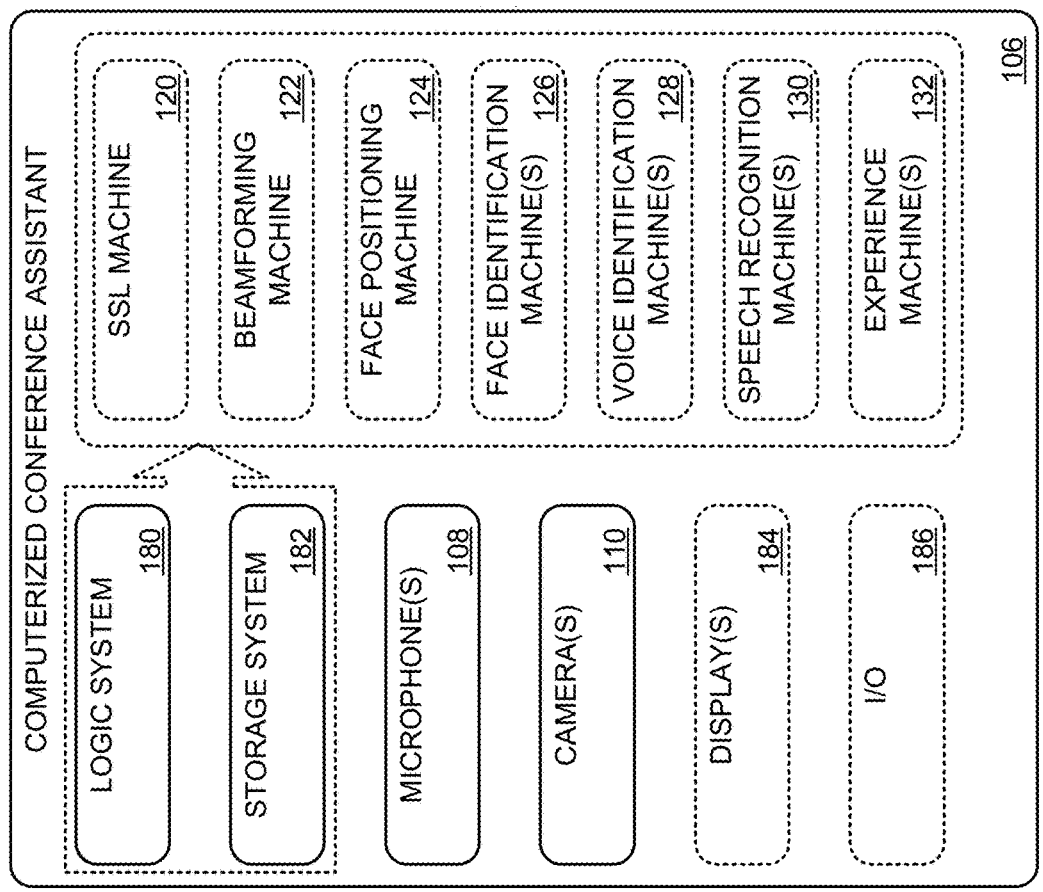
FIG. 1A-1C depict a computing environment including an exemplary computerized conference assistant.
Figure 1A:
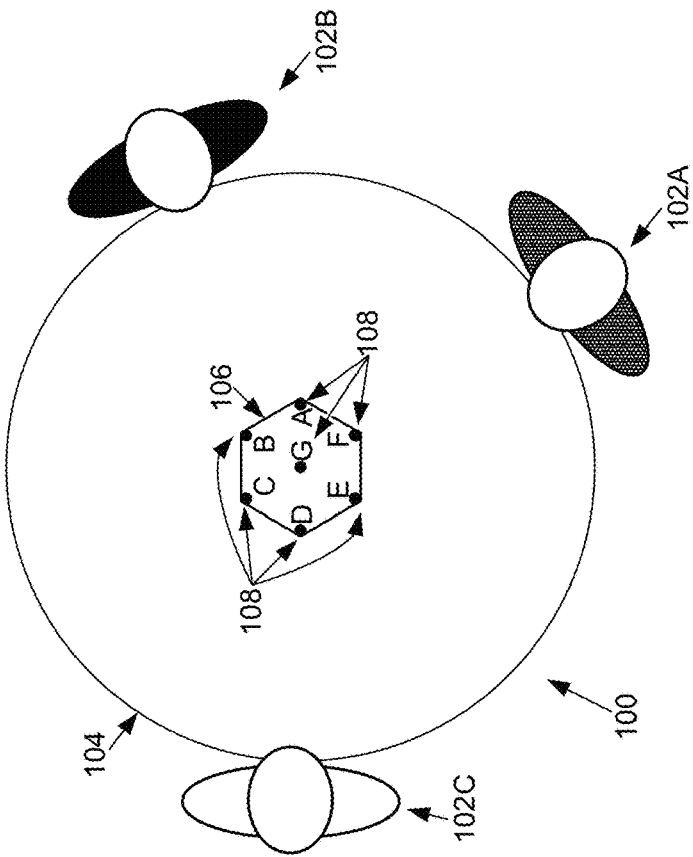

FIG. 1A shows an example conference environment 100 including three conference participants 102A, 102B, and 102C meeting around a table 104. A computerized conference assistant 106 is on table 104 ready to facilitate a meeting between the conference participants. Computerized conference assistants consistent with this disclosure may be configured with a myriad of features designed to facilitate productive meetings. However, the following description primarily focuses on features pertaining to associating recorded speech with the appropriate speaker. While the following description uses computerized conference assistant 106 as an example computing system configured to attribute speech to the correct speaker, other computers or combinations of computers utilizing any number of different microphone and/or camera configurations may be configured to utilize the techniques described herein. As such, the present disclosure is in no way limited to computerized conference assistant 106.

FIG. 1B schematically shows relevant aspects of computerized conference assistant 106, each of which is discussed below. Of particular relevance, computerized conference assistant 106 includes one or more microphone(s) 108 and one or more camera(s) 110.

Figure 1C:
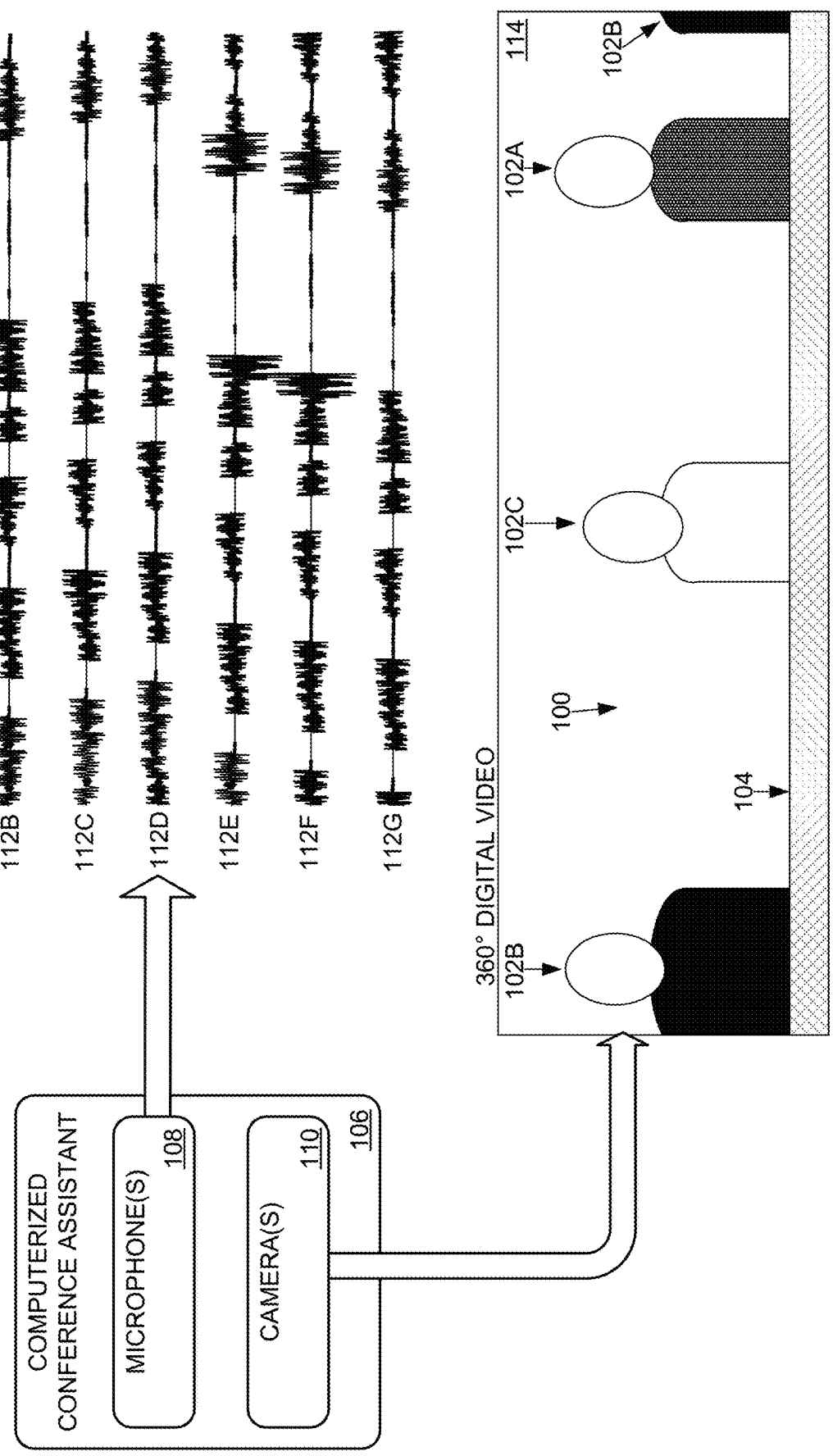

As shown in FIG. 1A, the computerized conference assistant 106 includes an array of seven microphones 108A, 108B, 108C, 108D, 108E, 108F, and 108G. As shown in FIG. 1C, these microphones 108 are configured to directionally record sound and convert the audible sound into a computer-readable signal 112 (i.e., signals 112a, 112b, 112c, 112d, 112e, 112f, and 112g respectively). Microphones 108A-F are equally spaced around the computerized conference assistant 106 and aimed to directionally record sound originating in front of the microphone. Microphone 108g is positioned between the other microphones and aimed upward.

In some implementations, computerized conference assistant 106 includes a 360° camera configured to convert light of one or more spectral bands (e.g., visible, infrared, and/or near infrared) into a 360° digital video 114 or other suitable visible, infrared, near infrared, spectral, and/or depth digital video. In some implementations, the 360° camera may include fisheye optics that redirect light from all azimuthal angles around the computerized conference assistant 106 to a single matrix of light sensors, and logic for mapping the independent measurements from the sensors to a corresponding matrix of pixels in the 360° digital video 114. In some implementations, two or more cooperating cameras may take overlapping sub-images that are stitched together into digital video 114. In some implementations, camera(s) 110 have a collective field of view of less than 360° and/or two or more originating perspectives (e.g., cameras pointing toward a center of the room from the four corners of the room). 360° digital video 114 is shown as being substantially rectangular without appreciable geometric distortion, although this is in no way required.

Returning briefly to FIG. 1B, computerized conference assistant 106 includes a sound source localization (SSL) machine 120 that is configured to estimate the location(s) of sound(s) based on signals 112. FIG. 2 schematically shows SSL machine 120 analyzing signals 112a-g to output an estimated origination 140 of the sound modeled by signals 112a-g. As introduced above, signals 112a-g are respectively generated by microphones 108a-g, and represent audio data captured by the microphones. Each microphone has a different physical position and/or is aimed in a different direction. Microphones that are farther from a sound source and/or aimed away from a sound source will generate a relatively lower amplitude and/or slightly phase delayed signal 112 (phase shift) relative to microphones that are closer to and/or aimed toward the sound source. As an example, while microphones 108a and 108d may respectively produce signals 112a and 112d in response to the same sound, signal 112a may have a measurably greater amplitude if the recorded sound originated in front of microphone 108a. Similarly, signal 112d may be phase shifted behind signal 112a due to the longer time of flight (ToF) of the sound to microphone 108d resulting from the speed of sound. Sound, for example, may be received at the microphone array as a mix of direct sound (shorter delay), and reflections and reverberation from various objects—which together with frequency determines the phase it arrives at the microphone. Note that the reflections not only change the direction of which the sound arrives to the microphones, but also the delay as the sound path increases. SSL machine 120 may use the amplitude, phase difference, and/or other parameters of the signals 112a-g to estimate the origination 140 of a sound. SSL machine 120 may be configured to implement any suitable two- or three-dimensional location algorithms, including but not limited to previously-trained artificial neural networks, maximum likelihood algorithms, multiple signal classification algorithms, and cross-power spectrum phase analysis algorithms. Depending on the algorithm(s) used in a particular application, the SSL machine 120 may output an angle, vector, coordinate, and/or other parameter estimating the origination 140 of a sound.

As shown in FIG. 1B, computerized conference assistant 106 also includes a beamforming machine 122. The beamforming machine 122 may be configured to isolate sounds originating in a particular zone (e.g., a 0-60° arc) from sounds originating in other zones. In the embodiment depicted in FIG. 3, beamforming machine 122 is configured to isolate sounds in any of six equally-sized static zones. In other implementations, there may be more or fewer static zones, dynamically sized zones (e.g., a focused 15° arc), and/or dynamically aimed zones (e.g., a 60° zone centered at 9°). Any suitable beamforming signal processing may be utilized to subtract sounds originating outside of a selected zone from a resulting beamformed signal 150. In implementations that utilize dynamic beamforming, the location or the positioning of the faces or heads of the various speakers may be used as criteria for selecting the number, size, and centering of the various beamforming zones. As one example, the number of zones may be selected to equal the number of speakers, and each zone may be centered on the location of the speaker (e.g., as determined via face identification and/or sound source localization). In some implementations beamforming machine may be configured to independently and simultaneously listen to two or more different zones, and output two or more different beamformed signals in parallel. As such, two or more overlapping/interrupting speakers may be independently processed.

Figure 4:
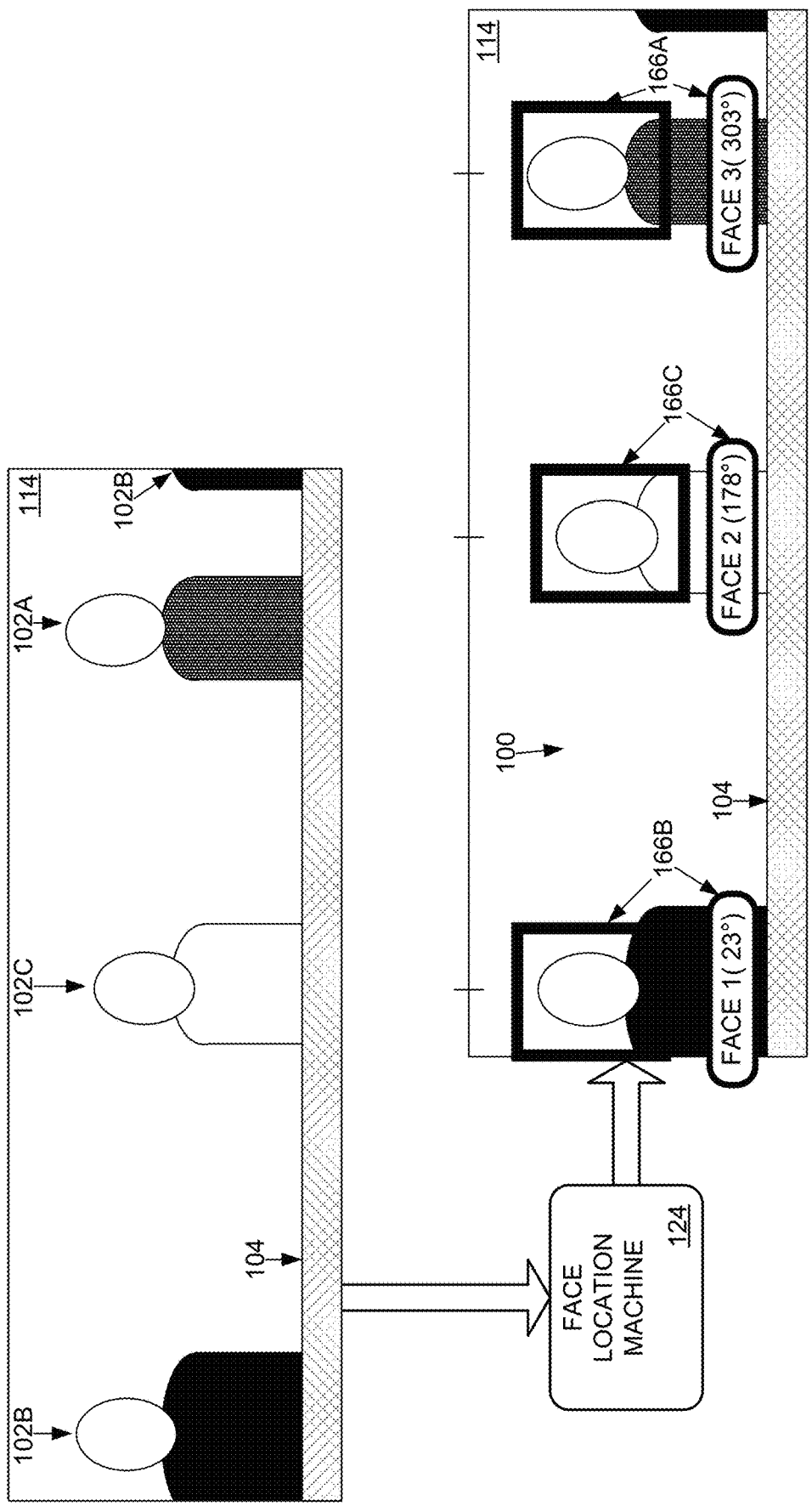
FIG. 4 schematically shows detection of human faces by a face detection machine.

As shown in FIG. 1B, computerized conference assistant 106 includes a face positioning machine 124 and a face identification machine 126. As shown in FIG. 4, face positioning machine 124 is configured to find candidate human faces 166 (and/or human heads in which the face is partially or fully occluded due to being orientated away from the camera) in digital video 114 and output an indication of a positioning of each face or head within a coordinate system. Digital video 114 includes image data representing image frames captured by a camera. A positioning of a face or head identified by face positioning machine 124 may include a position (i.e., a location) and/or an orientation of the face or head within a two or three-dimensional coordinate system. As an example, FIG. 4 shows face positioning machine 124 finding candidate FACE(1) at 23°, candidate FACE(2) at 178°, and candidate FACE(3) at 303° within an example coordinate system. The candidate faces 166 output by the face positioning machine 124 may include coordinates of a bounding box around a located face image, a portion of the digital image where the face was located, other positioning information (e.g., 23°), and/or labels (e.g., "FACE(1)"). As another example, face positioning machine 124 may output for each face, a position and/or an orientation of the face in a two or three-dimensional coordinate system. A position of the face may be represented by one or more corresponding values in one, two, or three degrees of freedom (e.g., X, Y, Z) of the coordinate system, and the orientation may be represented by one or more corresponding values in one, two, or three degrees of freedom (e.g., roll, pitch, yaw) of the coordinate system. The coordinate system may be relative to the reference frame of the camera or may be transformed to a different reference frame (e.g., a common, shared, or global reference frame) that may be used to identify and represent face positioning based on image data captured from multiple cameras.

Figure 5:
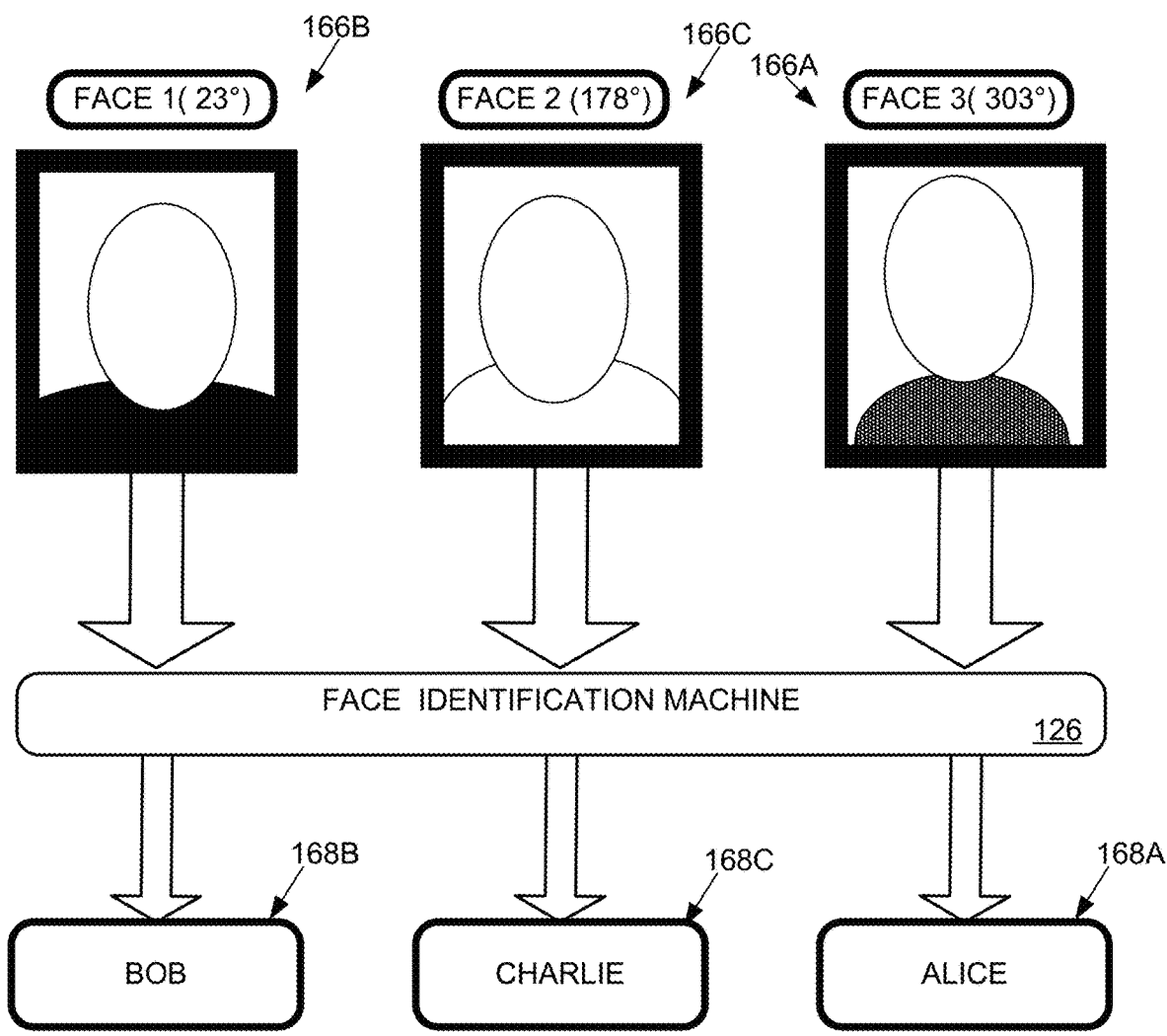
FIG. 5 schematically shows identification of human faces by a face identification machine.

Face identification machine 164 optionally may be configured to determine an identity 168 of each candidate face 166 by analyzing just the portions of the digital video 114 where candidate faces 166 have been found. In other implementations, the face positioning step may be omitted, and the face identification machine may analyze a larger portion of the digital video 114 to identify faces. FIG. 5 shows an example in which face identification machine 126 identifies candidate FACE(1) as "Bob," candidate FACE(2) as "Charlie," and candidate FACE(3) as "Alice." While not shown, each identity 168 may have an associated confidence value, and two or more different identities 168 having different confidence values may be found for the same face (e.g., Bob (88%), Bert (33%)). If an identity with at least a threshold confidence cannot be found, the face may remain unidentified and/or may be given a generic unique identity 168 (e.g., "Guest(42)"). Speech may be attributed to such generic unique identities.

When used, face positioning machine 124 may employ any suitable combination of state-of-the-art and/or future machine learning (ML) and/or artificial intelligence (AI) techniques. Non-limiting examples of techniques that may be incorporated in an implementation of face positioning machine 124 include support vector machines, multi-layer neural networks, convolutional neural networks (e.g., including spatial convolutional networks for processing images and/or videos), recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering) and/or graphical models (e.g., Markov models, conditional random fields, and/or AI knowledge bases).

In some examples, the methods and processes utilized by face positioning machine 124 may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters may be adjusted through any suitable training procedure, in order to continually improve functioning of the face positioning machine 124.

Non-limiting examples of training procedures for face positioning machine 124 include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or based on generative adversarial neural network training methods. In some examples, a plurality of components of face positioning machine 124 may be trained simultaneously with regard to an objective function measuring performance of collective functioning of the plurality of components (e.g., with regard to reinforcement feedback and/or with regard to labelled training data), in order to improve such collective functioning. In some examples, one or more components of face positioning machine 124 may be trained independently of other components (e.g., offline training on historical data). For example, face positioning machine 124 may be trained via supervised training on labelled training data comprising images with labels indicating any face(s) (or human heads occluding faces) present within such images, and with regard to an objective function measuring an accuracy, precision, and/or recall of locating/positioning faces/heads by face positioning machine 124 as compared to actual locations/positioning of faces/heads indicated in the labelled training data.

In some examples, face positioning machine 124 may employ a convolutional neural network configured to convolve inputs with one or more predefined, randomized and/or learned convolutional kernels. By convolving the convolutional kernels with an input vector (e.g., representing digital video 114), the convolutional neural network may detect a feature associated with the convolutional kernel. For example, a convolutional kernel may be convolved with an input image to detect low-level visual features such as lines, edges, corners, etc., based on various convolution operations with a plurality of different convolutional kernels. Convolved outputs of the various convolution operations may be processed by a pooling layer (e.g., max pooling) which may detect one or more most salient features of the input image and/or aggregate salient features of the input image, in order to detect salient features of the input image at particular locations in the input image. Pooled outputs of the pooling layer may be further processed by further convolutional layers. Convolutional kernels of further convolutional layers may recognize higher-level visual features, e.g., shapes and patterns, and more generally spatial arrangements of lower-level visual features. Some layers of the convolutional neural network may accordingly recognize and/or locate visual features of faces (e.g., noses, eyes, lips). Accordingly, the convolutional neural network may recognize and locate faces in the input image. Although the foregoing example is described with regard to a convolutional neural network, other neural network techniques may be able to detect and/or locate faces and other salient features based on detecting low-level visual features, higher-level visual features, and spatial arrangements of visual features.

Face identification machine 126 may employ any suitable combination of state-of-the-art and/or future ML and/or AI techniques. Non-limiting examples of techniques that may be incorporated in an implementation of face identification machine 126 include support vector machines, multi-layer neural networks, convolutional neural networks, recurrent neural networks, associative memories, unsupervised spatial and/or clustering methods, and/or graphical models.

In some examples, face identification machine 126 may be implemented using one or more differentiable functions and at least partially determined by a set of trainable parameters. Accordingly, the trainable parameters may be adjusted through any suitable training procedure, in order to continually improve functioning of the face identification machine 126.

Non-limiting examples of training procedures for face identification machine 126 include supervised training, zero-shot, few-shot, unsupervised learning methods, reinforcement learning and/or generative adversarial neural network training methods. In some examples, a plurality of components of face identification machine 126 may be trained simultaneously with regard to an objective function measuring performance of collective functioning of the plurality of components in order to improve such collective functioning. In some examples, one or more components of face identification machine 126 may be trained independently of other components.

In some examples, face identification machine 126 may employ a convolutional neural network configured to detect and/or locate salient features of input images. In some examples, face identification machine 126 may be trained via supervised training on labelled training data comprising images with labels indicating a specific identity of any face(s) present within such images, and with regard to an objective function measuring an accuracy, precision, and/or recall of identifying faces by face identification machine 126 as compared to actual identities of faces indicated in the labelled training data. In some examples, face identification machine 126 may be trained via supervised training on labelled training data comprising pairs of face images with labels indicating whether the two face images in a pair are images of a single individual or images of two different individuals, and with regard to an objective function measuring an accuracy, precision, and/or recall of distinguishing single-individual pairs from two-different-individual pairs.

In some examples, face identification machine 126 may be configured to classify faces by selecting and/or outputting a confidence value for an identity from a predefined selection of identities, e.g., a predefined selection of identities for whom face images were available in training data used to train face identification machine 126. In some examples, face identification machine 126 may be configured to assess a feature vector representing a face, e.g., based on an output of a hidden layer of a neural network employed in face identification machine 126. Feature vectors assessed by face identification machine 126 for a face image may represent an embedding of the face image in a representation space learned by face identification machine 126. Accordingly, feature vectors may represent salient features of faces based on such embedding in the representation sp ace.

In some examples, face identification machine 126 may be configured to enroll one or more individuals for later identification. Enrollment by face identification machine 126 may include assessing a feature vector representing the individual's face, e.g., based on an image and/or video of the individual's face. In some examples, identification of an individual based on a test image may be based on a comparison of a test feature vector assessed by face identification machine 126 for the test image, to a previously-assessed feature vector from when the individual was enrolled for later identification. Comparing a test feature vector to a feature vector from enrollment may be performed in any suitable fashion, e.g., using a measure of similarity such as cosine or inner product similarity, and/or by unsupervised spatial and/or clustering methods (e.g., approximative k-nearest neighbor methods). Comparing the test feature vector to the feature vector from enrollment may be suitable for assessing identity of individuals represented by the two vectors, e.g., based on comparing salient features of faces represented by the vectors.

As shown in FIG. 1B, computerized conference assistant 106 includes a voice identification machine 128. The voice identification machine 128 is analogous to the face identification machine 126 because it also attempts to identify an individual. However, unlike the face identification machine 126, which is trained on and operates on video images, the voice identification machine is trained on and operates on audio signals, such as beamformed signal 150 and/or signal(s) 112. The ML and AI techniques described above may be used by voice identification machine 128. The voice identification machine outputs voice IDs 170, optionally with corresponding confidences (e.g., Bob (77%)).

Figure 6:
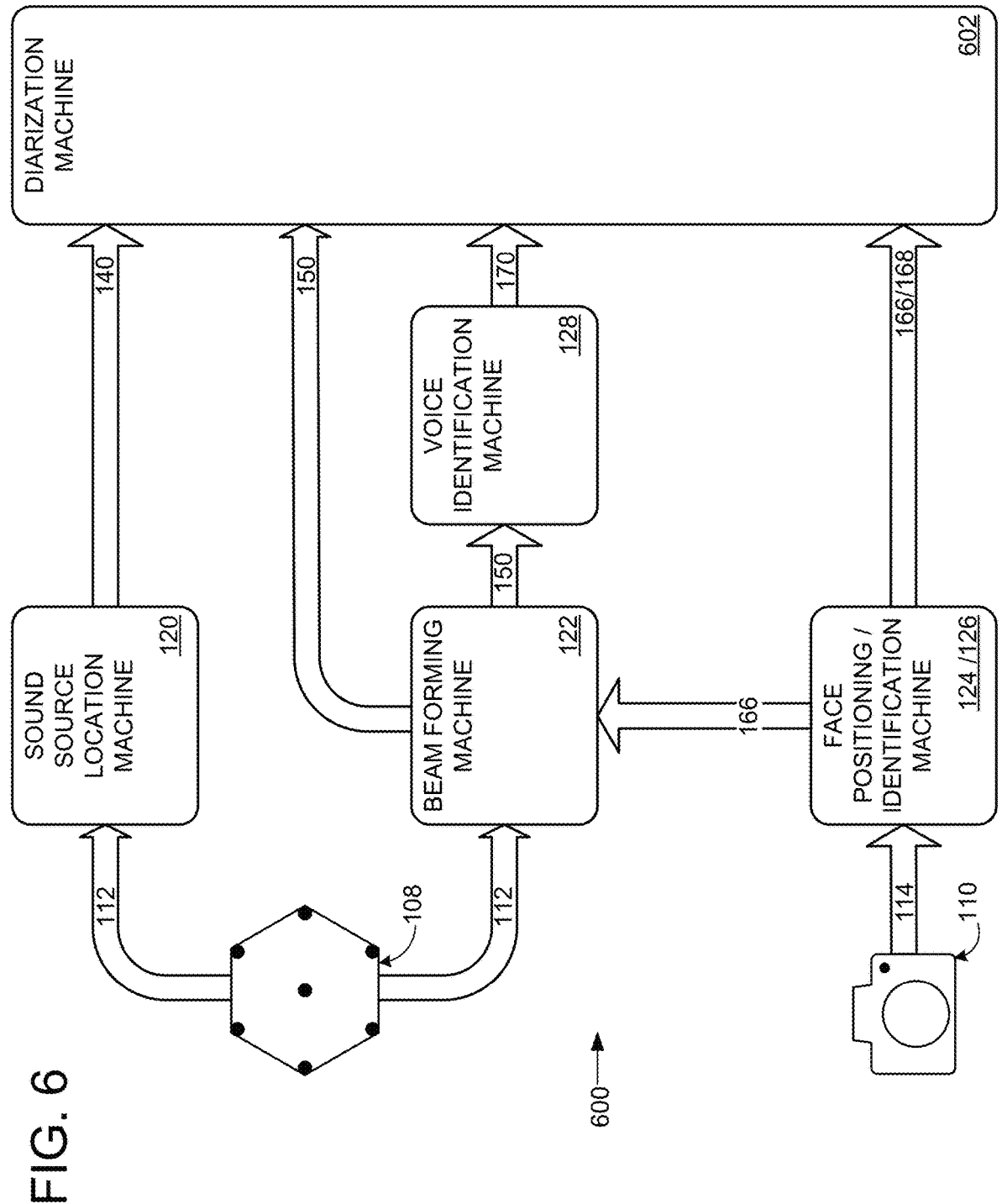
FIG. 6 schematically shows an exemplary diarization framework.

FIG. 6 schematically shows an example diarization framework 600 for the above-discussed components of computerized conference assistant 106. While diarization framework 600 is described below with reference to computerized conference assistant 106, the diarization framework may be implemented using different hardware, firmware, and/or software components (e.g., different microphone and/or camera placements and/or configurations). Furthermore, SSL machine 120, beamforming machine 122, face positioning machine 124, and/or face identification machine 128 may be used in different sensor fusion frameworks designed to associate speech utterances with the correct speaker.

In the illustrated implementation, microphones 108 provide signals 112 to SSL machine 120 and beamforming machine 122, and the SSL machine outputs origination 140 to diarization machine 602. Camera 110 provides 360° digital videos 114 to face positioning machine 124 and face identification machine 126. The face positioning machine passes the positioning (position and/or orientation) of candidate faces/heads 166 (e.g., 23°) to the beamforming machine 132, which the beamforming machine may utilize to select a desired zone where a speaker has been identified. As previously described, a positioning of a candidate face/heads may refer to one or more of a position of the candidate face/head and/or an orientation of the candidate face/head in a two or three-dimensional coordinate system. The beamforming machine 122 passes beamformed signal 150 to diarization machine 602 and to voice identification machine 128, which passes voice ID 170 to the diarization machine 602. Face identification machine 128 outputs identities 168 (e.g., "Bob") with corresponding positionings of candidate faces/heads (e.g., 23°) to the diarization machine. While not shown, the diarization machine may receive other information and use such information to attribute speech utterances with the correct speaker.

In at least some implementations, diarization machine 602 is a sensor fusion machine configured to use the various received signals to associate recorded speech with the appropriate speaker. Such signals may include a positioning of each human face/head identified from image data, including the position (i.e., location) and/or an orientation of that face. In one nonlimiting example, the following algorithm may be employed:

Video input (e.g., 360° digital video 114) from start to time t is denoted as $V_{1:t}$ Audio input from N microphones (e.g., signals 112) is denoted as $A_{1:t}^{[1:N]}$ Diarization machine 602 solves WHO is speaking, at WHERE and WHEN, by maximizing the following:

$$\max_{who, angle} P(who, angle | A_{1:t}^{[1:N]}, V_{1:t})$$

Where $P(who, angle | A_{1:t}^{[1:N]}, V_{1:t})$ is computed by $P(who | A_{1:t}^{[1:N]}, angle) \times P(angle | A_{1:t}^{[1:N]}) \times P(who, angle | V_{1:t})$ Where $P(who | A_{1:t}^{[1:N]}, angle)$ is the Voice ID 170, which takes N channel inputs and selects one beamformed signal 150 according to the angle of candidate face 166;

$P(angle | _{1:t}^{[1:N]})$ is the origination 140, which takes N channel inputs and predicts which angle most likely has sound;

$P(who, angle | V_{1:t})$ is the identity 168, which takes the video 114 as input and predicts the probability of each face showing up at each angle.

The above framework may be adapted to use any suitable processing strategies, including but not limited to the ML/AI techniques discussed above. Using the above framework, the probability of one face at the found angle is usually dominative, e.g., probability of Bob's face at 23° is 99%, and the probabilities of his face at all the other angles is almost 0%. However, other suitable techniques may be used, such as where multiple cameras are used that do not individually provide 360 degree capture of a physical environment, or where such cameras are not centrally located within a physical environment or are not co-located with the microphone array.

Figure 7:
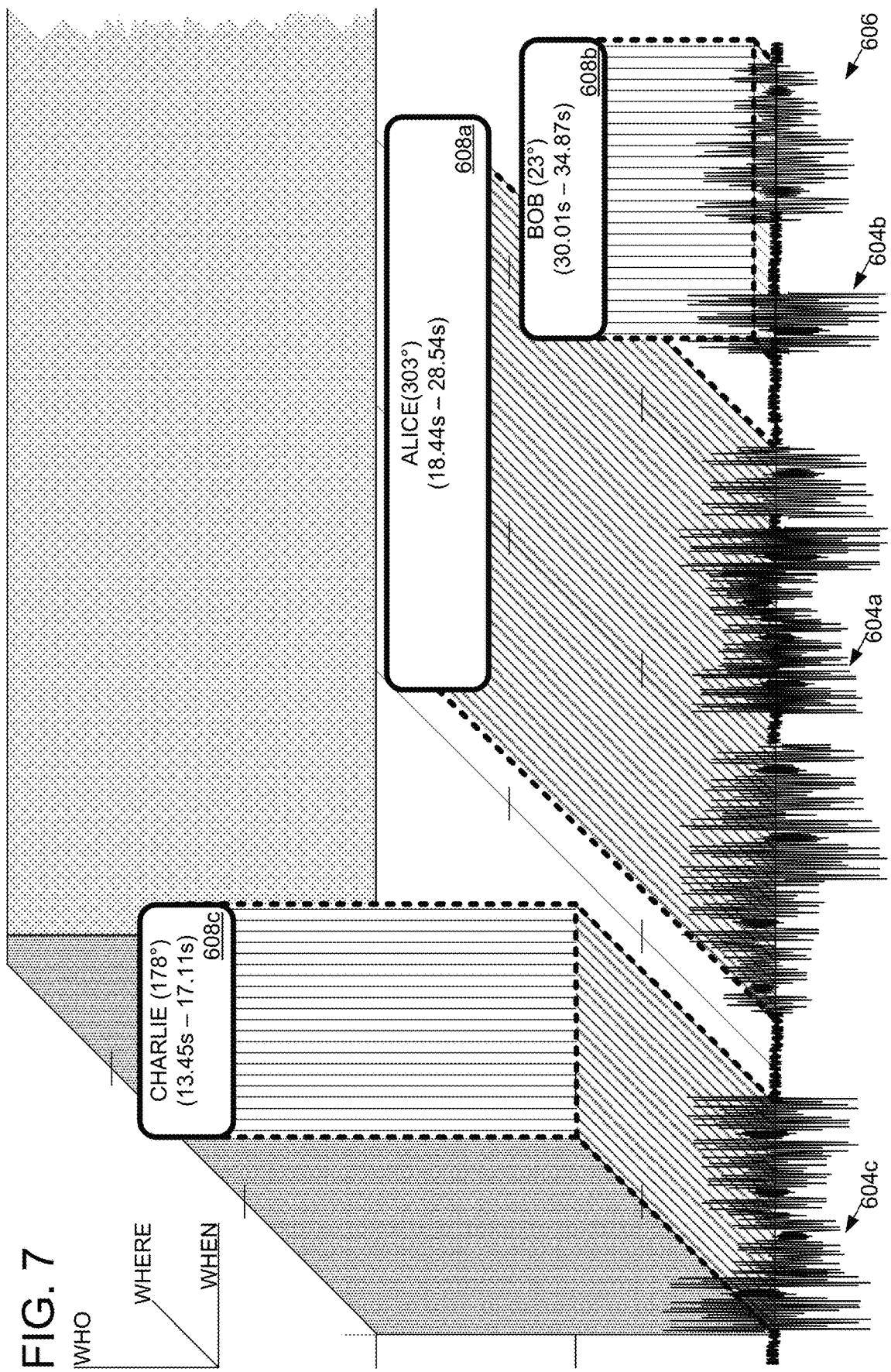
FIG. 7 is a visual representation of an example output of a diarization machine.

FIG. 7 is a visual representation of an example output of diarization machine 602. In FIG. 6, a vertical axis is used to denote WHO (e.g., Bob) is speaking; the horizontal axis denotes WHEN (e.g., 30.01 s 34.87 s) that speaker is speaking; and the depth axis denotes from WHERE (e.g., 23°) that speaker is speaking. Diarization machine 602 may use this WHO/WHEN/WHERE information to label corresponding segments 604 of the audio signal(s) 606 under analysis with labels 608. The segments 604 and/or corresponding labels may be output from the diarization machine 602 in any suitable format. The output effectively associates speech with a particular speaker during a conversation among N speakers, and allows the audio signal corresponding to each speech utterance (with WHO/WHEN/WHERE labeling/metadata) to be used for myriad downstream operations. One nonlimiting downstream operation is conversation transcription, as discussed in more detail below. As another example, accurately attributing speech utterances with the correct speaker can be used by an AI assistant to identify who is talking, thus decreasing a necessity for speakers to address an AI assistant with a keyword (e.g., "Cortana").

Figure 8:
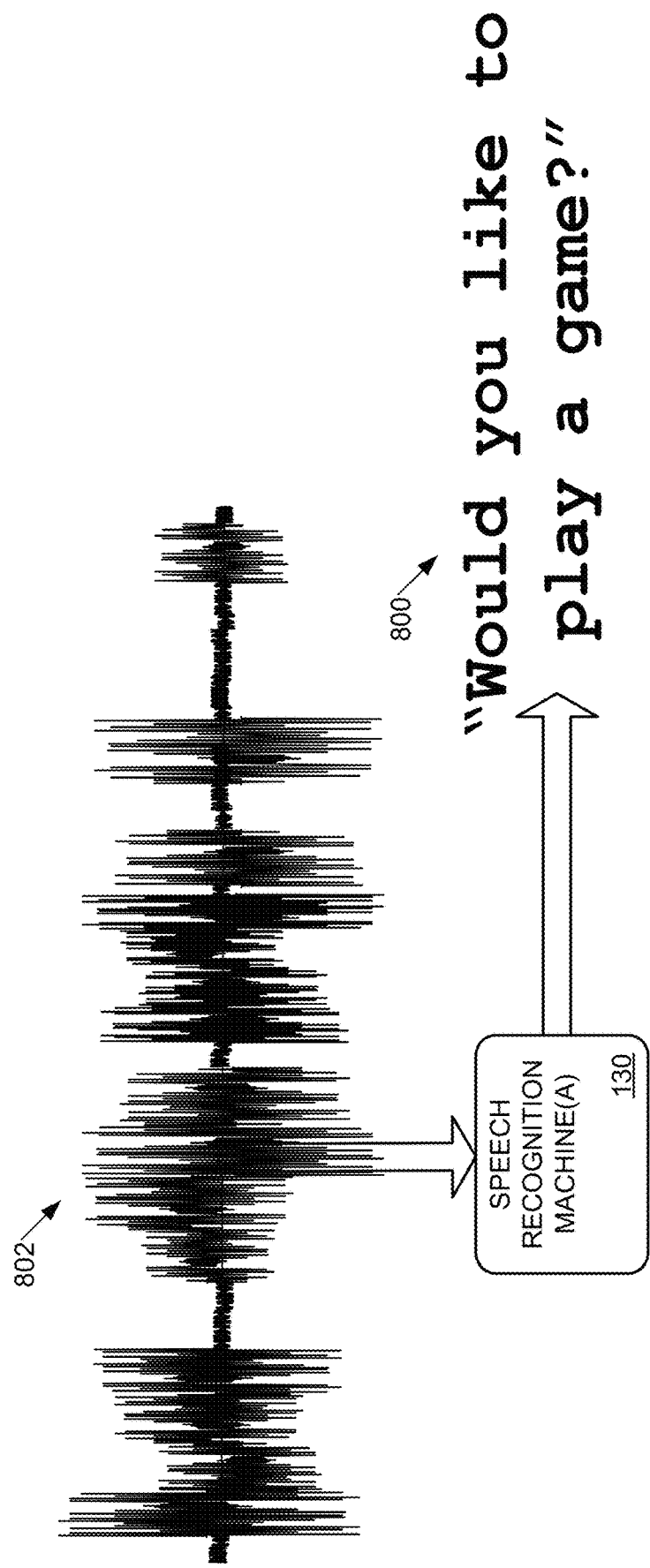
FIG. 8 schematically shows recognition of an utterance by a speech recognition machine.

Returning briefly to FIG. 1B, computerized conference assistant 106 may include a speech recognition machine 130. As shown in FIG. 8, the speech recognition machine 130 may be configured to translate an audio signal of recorded speech (e.g., signals 112, beamformed signal 150, signal 606, and/or segments 604) into text 800. In the scenario illustrated in FIG. 8, speech recognition machine 130 translates signal 802 into the text: "Would you like to play a game?"

Speech recognition machine 130 may employ any suitable combination of state-of-the-art and/or future natural language processing (NLP), AI, and/or ML techniques. Nonlimiting examples of techniques that may be incorporated in an implementation of speech recognition machine 130 include support vector machines, multi-layer neural networks, convolutional neural networks (e.g., including temporal convolutional neural networks for processing natural language sentences), word embedding models (e.g., GloVe or Word2Vec), recurrent neural networks, associative memories, unsupervised spatial and/or clustering methods, graphical models, and/or natural language processing techniques (e.g., tokenization, stemming, constituency and/or dependency parsing, and/or intent recognition).

In some examples, speech recognition machine 130 may be implemented using one or more differentiable functions and at least partially determined by a set of trainable parameters. Accordingly, the trainable parameters may be adjusted through any suitable training procedure, in order to continually improve functioning of the speech recognition machine 130.

Non-limiting examples of training procedures for speech recognition machine 130 include supervised training, zero-shot, few-shot, unsupervised learning methods, reinforcement learning and/or generative adversarial neural network training methods. In some examples, a plurality of components of speech recognition machine 130 may be trained simultaneously with regard to an objective function measuring performance of collective functioning of the plurality of components in order to improve such collective functioning. In some examples, one or more components of speech recognition machine 130 may be trained independently of other components. In an example, speech recognition machine 130 may be trained via supervised training on labelled training data comprising speech audio annotated to indicate actual lexical data (e.g., words, phrases, and/or any other language data in textual form) corresponding to the speech audio, with regard to an objective function measuring an accuracy, precision, and/or recall of correctly recognizing lexical data corresponding to speech audio.

In some examples, speech recognition machine 130 may use an AI and/or ML model (e.g., an LSTM and/or a temporal convolutional neural network) to represent speech audio in a computer-readable format. In some examples, speech recognition machine 130 may represent speech audio input as word embedding vectors in a learned representation space shared by a speech audio model and a word embedding model (e.g., a latent representation space for GloVe vectors, and/or a latent representation space for Word2Vec vectors). Accordingly, by representing speech audio inputs and words in the learned representation space, speech recognition machine 130 may compare vectors representing speech audio to vectors representing words, to assess, for a speech audio input, a closest word embedding vector (e.g., based on cosine similarity and/or approximative k-nearest neighbor methods or any other suitable comparison method).

In some examples, speech recognition machine 130 may be configured to segment speech audio into words (e.g., using LSTM trained to recognize word boundaries, and/or separating words based on silences or amplitude differences between adjacent words). In some examples, speech recognition machine 130 may classify individual words to assess lexical data for each individual word (e.g., character sequences, word sequences, n-grams). In some examples, speech recognition machine 130 may employ dependency and/or constituency parsing to derive a parse tree for lexical data. In some examples, speech recognition machine 130 may operate AI and/or ML models (e.g., LSTM) to translate speech audio and/or vectors representing speech audio in the learned representation space, into lexical data, wherein translating a word in the sequence is based on the speech audio at a current time and further based on an internal state of the AI and/or ML models representing previous words from previous times in the sequence. Translating a word from speech audio to lexical data in this fashion may capture relationships between words that are potentially informative for speech recognition, e.g., recognizing a potentially ambiguous word based on a context of previous words, and/or recognizing a mispronounced word based on a context of previous words. Accordingly, speech recognition machine 130 may be able to robustly recognize speech, even when such speech may include ambiguities, mispronunciations, etc.

Speech recognition machine 130 may be trained with regard to an individual, a plurality of individuals, and/or a population. Training speech recognition machine 130 with regard to a population of individuals may cause speech recognition machine 130 to robustly recognize speech by members of the population, taking into account possible distinct characteristics of speech that may occur more frequently within the population (e.g., different languages of speech, speaking accents, vocabulary, and/or any other distinctive characteristics of speech that may vary between members of populations). Training speech recognition machine 130 with regard to an individual and/or with regard to a plurality of individuals may further tune recognition of speech to take into account further differences in speech characteristics of the individual and/or plurality of individuals. In some examples, different speech recognition machines (e.g., a speech recognition machine (A) and a speech recognition (B)) may be trained with regard to different populations of individuals, thereby causing each different speech recognition machine to robustly recognize speech by members of different populations, taking into account speech characteristics that may differ between the different populations.

Figure 9:
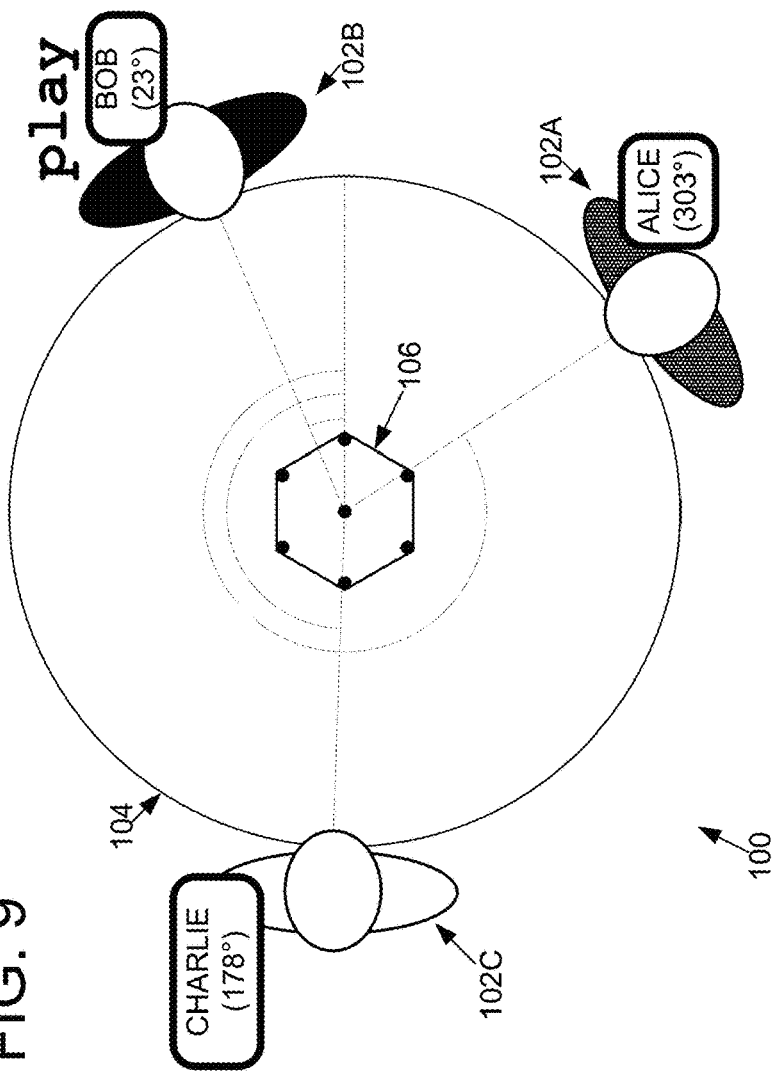
FIG. 9 shows an example of diarization by a computerized conference assistant.

Labeled and/or partially labelled audio segments may be used to not only determine which of a plurality of N speakers is responsible for an utterance, but also translate the utterance into a textural representation for downstream operations, such as transcription. FIG. 9 shows a nonlimiting example in which the computerized conference assistant 106 uses microphones 108 and camera 110 to determine that a particular stream of sounds is a speech utterance from Bob, who is sitting at 23° around the table 104 and saying: "Would you like to play a game?" The identities and positions of Charlie and Alice are also resolved, so that speech utterances from those speakers may be similarly attributed and translated into text.

Figure 10:
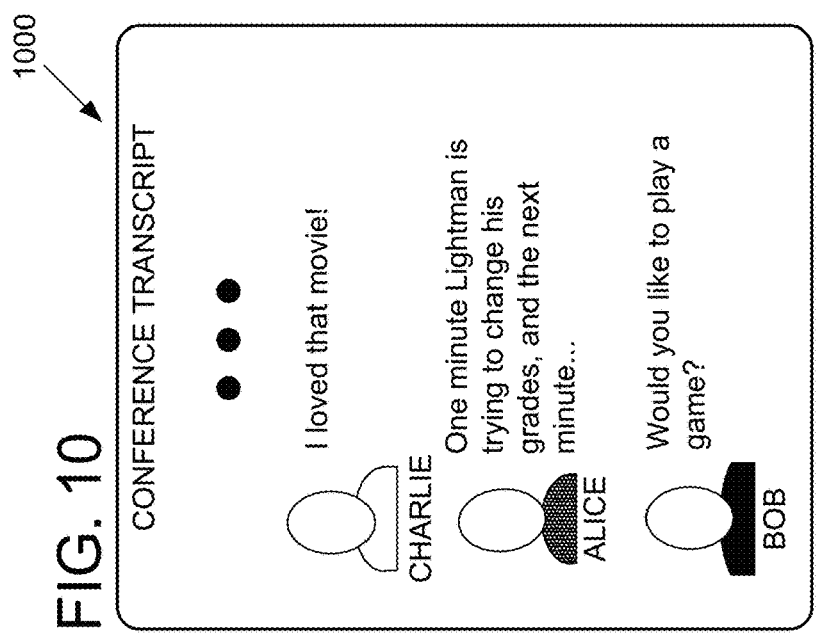
FIG. 10 shows an example conference transcript.

FIG. 10 shows an example conference transcript 1000, which includes text attributed, in chronological order, to the correct speakers. Transcriptions optionally may include other information, like the times of each speech utterance and/or the position of the speaker of each utterance. In scenarios in which speakers of different languages are participating in a conference, the text may be translated into a different language. For example, each reader of the transcript may be presented a version of the transcript with all text in that reader's preferred language, even if one or more of the speakers originally spoke in different languages. Transcripts generated according to this disclosure may be updated in realtime, such that new text can be added to the transcript with the proper speaker attribution responsive to each new utterance.

Figure 11:
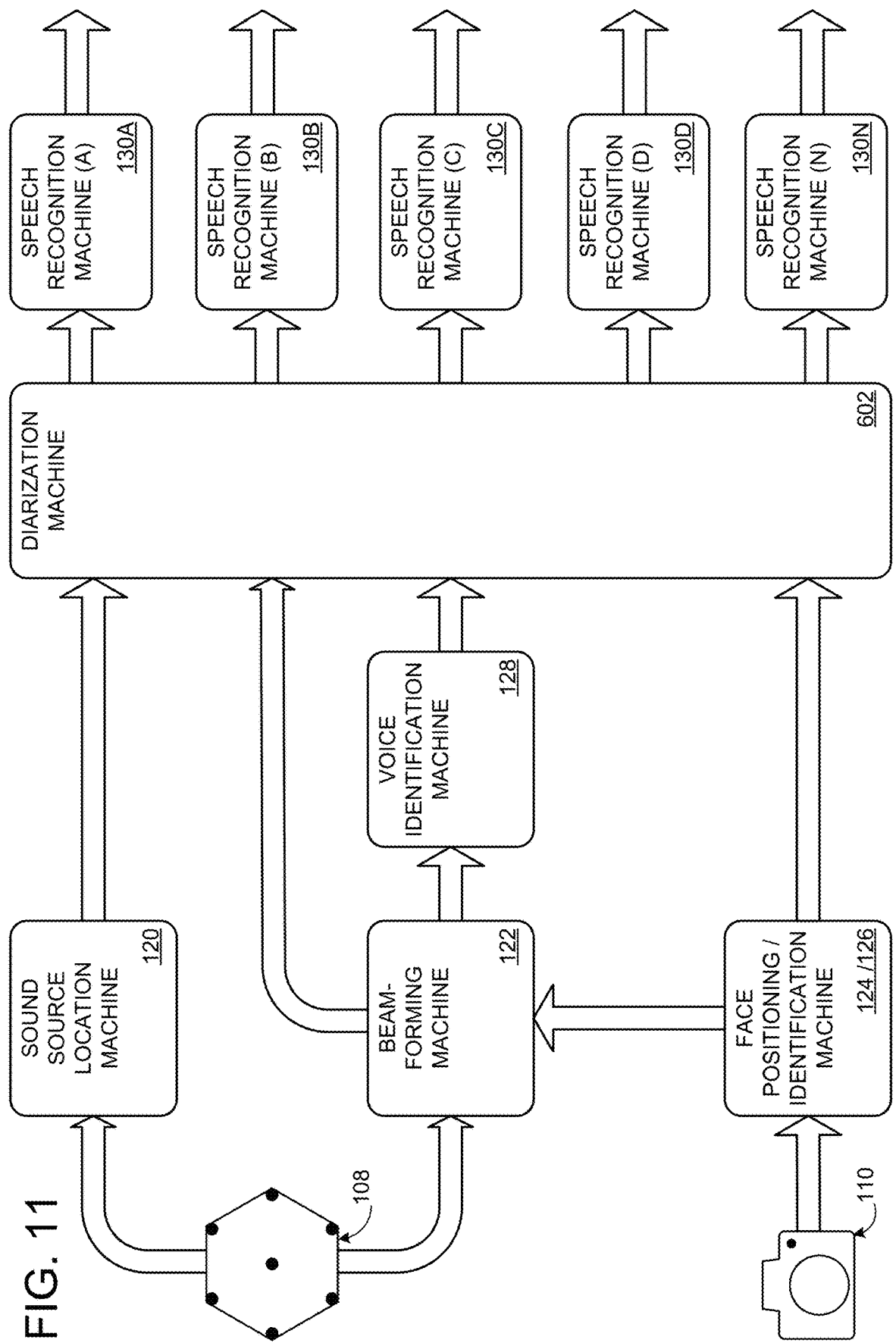
FIG. 11 schematically shows an exemplary diarization framework in which speech recognition machines are downstream from a diarization machine.

FIG. 11 shows a nonlimiting framework 1100 in which speech recognition machines 130a-n are downstream from diarization machine 602. Each speech recognition machine 130 optionally may be tuned for a particular individual speaker (e.g., Bob) or species of speakers (e.g., Chinese language speaker, or English speaker with Chinese accent). In some embodiments, a user profile may specify a speech recognition machine (or parameters thereof) suited for the particular user, and that speech recognition machine (or parameters) may be used when the user is identified (e.g., via face recognition). In this way, a speech recognition machine tuned with a specific grammar and/or acoustic model may be selected for a particular speaker. Furthermore, because the speech from each different speaker may be processed independent of the speech of all other speakers, the grammar and/or acoustic model of all speakers may be dynamically updated in parallel on the fly. In the embodiment illustrated in FIG. 11, each speech recognition machine may receive segments 604 and labels 608 for a corresponding speaker, and each speech recognition machine may be configured to output text 800 with labels 608 for downstream operations, such as transcription.

Figure 12:
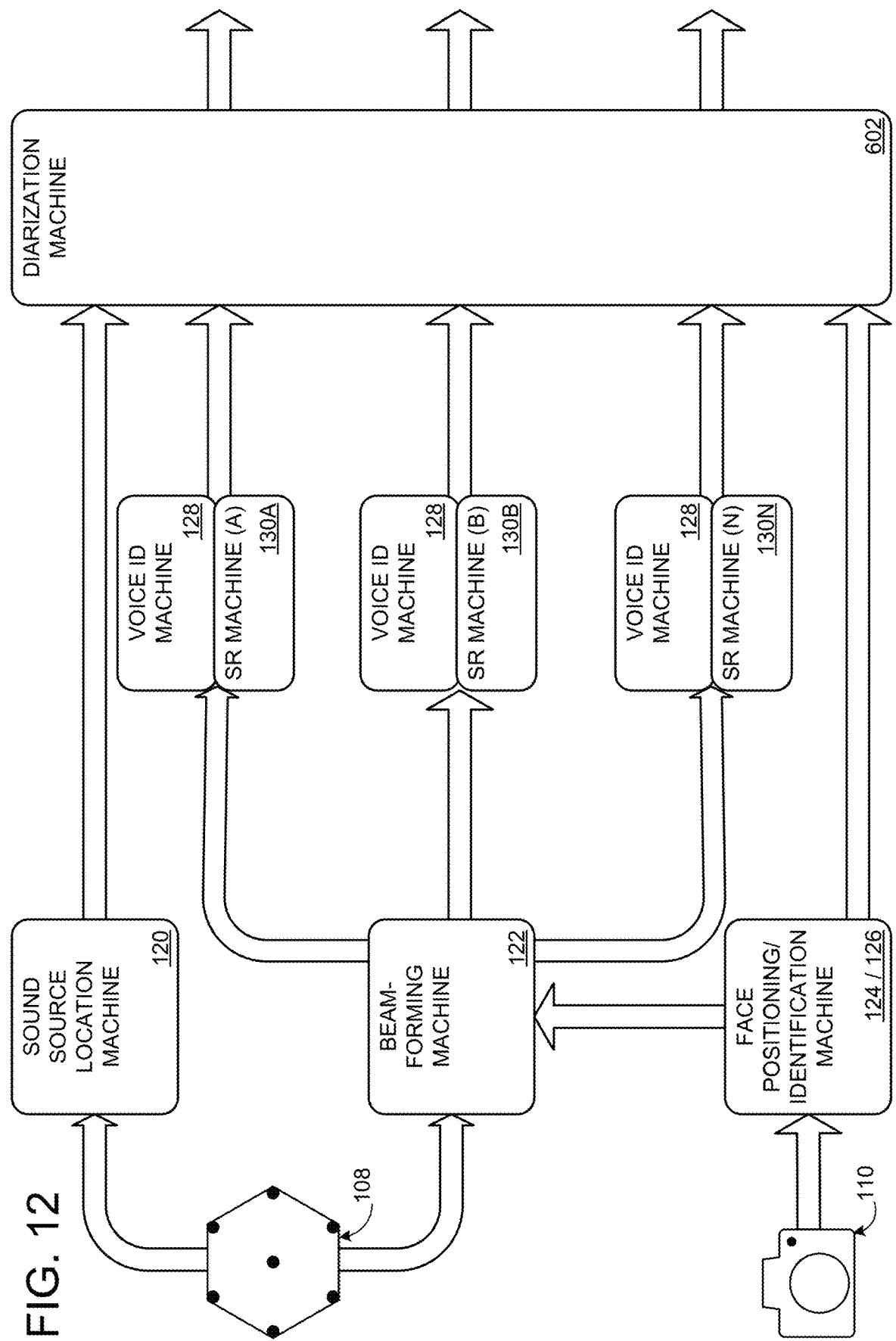
FIG. 12 schematically shows an exemplary diarization framework in which speech recognition machines are upstream from a diarization machine.

FIG. 12 shows a nonlimiting framework 1200 in which speech recognition machines 130*a-n* are upstream from diarization machine 602. In such a framework, diarization machine 602 may initially apply labels 608 to text 800 in addition to or instead of segments 604. Furthermore, the diarization machine may consider natural language attributes of text 800 as additional input signals when resolving which speaker is responsible for each utterance.

FIG. 13 is a flow diagram depicting an example processing pipeline 1300 including associated method 1370. Processing pipeline 1300 and associated method 1370 may be performed or otherwise implemented by a computing system, such as described herein with reference to FIG. 1B, as a non-limiting example.

For each microphone of a microphone array 1310 of two or more microphones (1312, 1314, 1316, etc.) monitoring a physical environment, method 1370 includes receiving audio data captured by that microphone at 1372, and transforming the audio data captured by that microphone to obtain a frequency domain representation of the audio data that is discretized in a plurality of frequency intervals at 1374. The audio data may represent a time interval (i.e., a period of time) of an audio data stream captured by each microphone of the microphone array. Within FIG. 13, operations 1372 and 1374 of method 1370 may form part of audio pre-processing 1320. As a non-limiting example, audio pre-processing 1320 may be performed or otherwise implemented by one or more of the SSL, beamforming, voice identification, and/or speech recognition machines disclosed herein.

The transform applied to the acoustic data may be a fast Fourier transform or other suitable transform. Let $x(\omega)$ denote a frequency domain representation of acoustic data x, where $\omega$ is the frequency. When discrete-time acoustic data is expressed in the frequency domain, the frequency range of the microphone is discretized in a plurality K of intervals, also referred to as frequency bands. Each frequency band is defined by a predetermined bandwidth $B_k$ and center frequency $\omega_k$ with $1 \leq k \leq K$, which are determined by the transform. Frequency bands may be selected to be narrow enough (have sufficiently small $B_k$) to support the frequency-specific audio source localization techniques disclosed herein.

For each camera of a camera array 1330 of one or more cameras (1332, 1334, 1336, etc.) monitoring the physical environment, method 1370 includes receiving image data captured by that camera at 1376, and determining a positioning of each human face/head captured by that camera based on the image data relative to a reference coordinate system at 1378. The positioning of each human face/head may include a position and an orientation of that face/head relative to a reference coordinate system. Within FIG. 13, operations 1376 and 1378 of method 1370 may form part of image pre-processing 1340. As a non-limiting example, image pre-processing 1340 may be performed by one or more of the face positioning and/or face identification machines disclosed herein. For example, the position of each human face may be determined based on the image data by using a previously-trained, face positioning classifier that refers to or forms part of the previously described face positioning machine 124.

As previously described, the positioning of each human face/head may be within a three-dimensional or two-dimensional coordinate system depending on implementation. For example, each human face captured by a camera within the image data may be assigned a position in a two-degree of freedom (2DOF) or three-degree of freedom (3DOF) coordinate space (e.g., X, Y, Z), and an orientation in 2DOF or 3DOF coordinate space (e.g., tilt, yaw, roll). A position and an orientation of a human face may be defined with respect to one or more features of the human face, such as the nose, eyes, brow, ears, chin, etc., as well as the occlusion of such features (e.g., by other portions of the head) due to the subject facing away from the camera. Collectively, the positioning of each human face/head may be represented in 6DOF coordinate space within a reference coordinate system. The reference coordinate system may be with respect to the camera that captured the image data in at least some implementations. However, in multi-camera implementations, a known positioning of two or more cameras of the camera array relative to each other may be used to transform the relative positioning of each face/head captured by a particular camera to a common, shared, or global coordinate system for each of the cameras.

At 1380, method 1370 includes providing input data to a previously-trained, audio source localization classifier 1350. In at least some implementations, classifier 1350 may refer to or form part of previously described SSL machine 120. The input data includes the frequency domain representation of the audio data captured by each microphone of the microphone array at 1374, and the positioning of each human face/head captured by each camera of the camera array at 1378. The positioning of each human face/head may represent a candidate audio source having a position and orientation-based vector of that audio source for the classifier with respect to the audio data for the particular time interval of the audio data. In at least some implementations, each candidate audio source may be modeled as a point source that is located at a positioning of a mouth of each human face in which the direction of the sound source points outward (at a predefined angle—e.g., surface normal) from the face at the location of the mouth.

Traditional approaches of sound source localization use the microphone array and compare the received signal to the expected signal for each possible sound direction. Then, the direction with minimal error between the ideal (math) model and the received signal is selected. A potential issue with this approach is that reflections from objects in the room (e.g., laptops on the table, walls, table) cause the acoustic signal to arrive from a variety of directions—which sometimes causes significant error in the estimation of sound direction. This is even more significant if the speaker is not facing towards the microphone array. As an alternative to this traditional approach, classifier 1350 uses both camera and microphone array data to compare predicted audio signals for audio sources that correspond to the positioning of each face/head and the actual audio signals captured by each microphone of the array at each frequency or frequency interval of a plurality of frequency intervals. The output of the classifier identifies which face is more likely to be the active speaker based on the face/head positioning and spectrum of received audio signal for each microphone. Instead of using a mathematical model of the ideal expected audio signal by direction of sound, the classifier will use trained data to map between the input data and the likelihood of each face being the active speaker based on the face position, and direction (e.g., head orientation) relative to the microphone array.

Classifier 1350 may be previously trained as indicated schematically at 1390. Classifier 150 may be referred to as a classifier machine, such as previously described with reference to the other machines of FIG. 1B. Classifier 1350 may form part of and incorporate aspects of the previously described SSL machine, for example. Within the context of a commercially deployed implementation, following training of classifier 1350, an instance of that classifier (and other program components) may be distributed to end users as a component of a computer program.

As a non-limiting example of training at 1390, classifier 1350 may be trained by providing the classifier with a relatively large data set collected from a diversity of physical environments (e.g., room configurations), containing a range of different physical objects having a diverse range of positionings within the physical environments. During data collection, an individual human subject may speak aloud, with his or her face having a diverse range of (e.g., randomized) positionings that are captured by a camera. An error represented by a difference between a predicted and a measured audio signal for audio data captured by a microphone for each frequency interval of the audio signal may be used as features that are provided to the classifier during training, together with the positioning of the face/head of the human subject relative to the camera. An audio source may be identified by classifier 1350 based on a combination of an estimated confidence identified for each frequency interval of the plurality of frequency intervals of the frequency domain representation for the time interval of the audio data. Using machine learning based on deep learning (e.g., a convolutional neural network or other machine learning/AI system disclosed herein) incorporated into the classifier, the classifier learns the probability that the audio signal arrived from the face of the human subject for a given set of input data. For example, face position obtained by face detection and face/head orientation obtained by a previously trained classifier generates multiple candidate audio sources for the audio data that may be fed to a downstream algorithm of classifier 1350 that receives the audio data as input from the microphone array at multiple frequency intervals, determines if this audio data matches each candidate audio source (e.g., in video captured by one or more of the cameras), and selects the candidate with the highest score (e.g., greatest confidence/probability). As previously described, this downstream algorithm of the classifier may be trained on data from many rooms or other physical environments having a variety of different configurations within which a person speaking aloud to generate audio data is located at a variety of different face positions and face/head orientations. Examples of such training are previously described with reference to the SSL machine or other machines disclosed herein.

At 1382, method 1370 includes receiving from the classifier for, based on the input data, an indication of an identified audio source from among the one or more candidate audio sources that is estimated to be the human face from which the audio data originated for the time interval of the audio data. As a non-limiting example, classifier 1350 may output an estimated confidence value or probability value that a particular human face is the audio source of the audio data for each frequency interval of the plurality of frequency intervals and/or for a combination of the plurality of frequency intervals of the audio source. For example, an audio source may be identified by classifier 1350 based on a combination of an estimated confidence identified for each frequency interval of the plurality of frequency intervals of the frequency domain representation. The frequency intervals used for training may be the same frequency intervals used in subsequent deployed implementations of the classifier to identify likely sources of the audio data. For implementations in which classifier 1350 outputs a confidence or probability value for each face captured by a camera of the camera array, post processing at 1360 may identify the human face having the greatest confidence or probability as being the audio source of the audio data for each frequency interval or for a combination of the plurality of frequency intervals of the audio source. Alternatively, classifier 1350 may identify which human face is estimated to be the source of the audio data using thresholds applied internally within the classifier on an individual frequency interval basis or for a combination of the plurality of frequency intervals of the audio source.

Post processing at 1360 may further include performing, at 1384, any of the speech diarization, recognition, transcription, and/or audio beamforming techniques disclosed herein, as non-limiting examples. As an example, post processing at 1384 may include attributing an identified audio source to an identity from which the audio data originated for the time interval of the audio data. In at least some implementations, the previously described diarization machine 602 may attribute identified audio sources to identifies of human speakers. For each human face, an identity of the human face may be determined based on the image data by using a previously trained, face identification classifier, for example. This previously trained, face identification classifier may refer to or form part of the previously described face identification machine 126. Alternatively or additionally, an identity of the identified audio source may be determined based on the audio data by using a previously trained, voice identification classifier, for example. This previously trained, voice identification classifier may refer to or form part of the previously described voice identification machine 128. In each of these examples, attributing an identified audio source to an identity may include associating or storing a data label indicating the identity with the audio data for the. The data label (indicating the identity of the speaker—the WHO) may be stored or otherwise associated with the audio data as metadata. As previously described, other suitable data labels indicating the timing (the time interval of the audio data indicating the WHEN) and positioning (position and/or orientation—the WHERE) of the identified audio source may be stored or otherwise associated with the audio data as metadata.

As another example of post processing at 1384, the method may include generating a beamformer configured to remove noise and interference from the audio data by targeting the position and/or the orientation of the identified audio source estimated to be the human face from which the audio data originated. Such beamforming may be performed by previously described beamforming machine 122, for example. Within the context of beamforming, the positioning of the audio source estimated to be the human face/head from which the audio data originated may replace or augment acoustic imaging techniques used by beamformers to identify the source of signals of interest and/or noise/interfering signals. The beamformer may be generated with a unity gain response toward the signal of interest of the identified audio source and a spatial null toward each source of interference on a per-frequency interval basis, as a non-limiting example. The generated beamformer may be a minimum variance directional response (MVDR) beamformer, or a deterministic beamformer, such as a least-squares beamformer or a deterministic maximum likelihood beamformer, as non-limiting examples. The beamforming machine may be further configured to generate an acoustic rake receiver that combines the signal of interest with the one or more reflections. A phase shift relative to the signal of interest may be applied to each reflection so constructive interference is achieved, and the energy of a sum of the signal of interest and each reflection is maximized. The acoustic rake receiver may thus increase a signal-to-noise ratio of the signal of interest.

Speech diarization, recognition, and transcription, as well as the beamforming techniques described herein may be tied to a computing system of one or more computing devices. In particular, such methods and processes may be implemented as a computer-application program or service, an application-programming interface (API), a library, and/or other computer-program product.

FIG. 1B schematically shows a non-limiting embodiment of a computerized conference assistant 106 that can enact one or more of the methods, processes, and/or processing strategies described above. Computerized conference assistant 106 is shown in simplified form in FIG. 1B. Computerized conference assistant 106 may take the form of one or more stand-alone microphone/camera computers, Internet of Things (IoT) appliances, personal computers, tablet computers, home-entertainment computers, network computing devices, gaming devices, mobile computing devices, mobile communication devices (e.g., smart phone), and/or other computing devices in other implementations. In general, the methods and processes described herein may be adapted to a variety of different computing systems having a variety of different microphone and/or camera configurations.

Computerized conference assistant 106 includes a logic system 180 and a storage system 182. Computerized conference assistant 106 may optionally include display(s) 184, input/output (I/O) 186, and/or other components not shown in FIG. 1B.

Logic system 180 includes one or more physical devices configured to execute instructions. For example, the logic system may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic system may include one or more processors configured to execute software instructions. Additionally or alternatively, the logic system may include one or more hardware or firmware logic circuits configured to execute hardware or firmware instructions. Processors of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely accessible, networked computing devices configured in a cloud-computing configuration.

Storage system 182 includes one or more physical devices configured to hold instructions executable by the logic system to implement the methods and processes described herein. When such methods and processes are implemented, the state of storage system 182 may be transformed—e.g., to hold different data.

Storage system 182 may include removable and/or built-in devices. Storage system 182 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage system 182 may include volatile, nonvolatile, dynamic, static, read/write, read-only, random-access, sequential-access, location-addressable, file-addressable, and/or content-addressable devices.

It will be appreciated that storage system 182 includes one or more physical devices and is not merely an electromagnetic signal, an optical signal, etc. that is not held by a physical device for a finite duration.

Aspects of logic system 180 and storage system 182 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

As shown in FIG. 1B, logic system 180 and storage system 182 may cooperate to instantiate SSL machine 120, beamforming machine 122, face positioning machine 124, face identification machine 126, voice identification machine 128, speech recognition machine 130, and experience machines 132. As used herein, the term "machine" is used to collectively refer to the combination of hardware, firmware, software, and/or any other components that are cooperating to provide the described functionality. In other words, "machines" are never abstract ideas and always have a tangible form. The software and/or other instructions that give a particular machine its functionality may optionally be saved as an unexecuted module on a suitable storage device, and such a module may be transmitted via network communication and/or transfer of the physical storage device on which the module is saved.

When included, display(s) 184 may be used to present a visual representation of data held by storage system 182. This visual representation may take the form of a graphical user interface (GUI). As one example, transcript 1000 may be visually presented on a display 184. As the herein described methods and processes change the data held by the storage machine, and thus transform the state of the storage machine, the state of display(s) 184 may likewise be transformed to visually represent changes in the underlying data. For example, new user utterances may be added to transcript 1000. Display(s) 184 may include one or more display devices utilizing virtually any type of technology. Such display devices may be combined with logic system 180 and/or storage system 182 in a shared enclosure, or such display devices may be peripheral display devices.

When included, input/output (I/O) 186 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

Furthermore, I/O 186 optionally may include a communication subsystem configured to communicatively couple computerized conference assistant 106 with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computerized conference assistant 106 to send and/or receive messages to and/or from other devices via a network such as the Internet.

In an example of the present disclosure, a method performed by a computing system comprises: for each camera of a camera array of one or more cameras monitoring a physical environment: receiving image data captured by that camera, and determining a positioning of each human face captured by that camera based on the image data, the positioning of each human face including a position and an orientation of that human face or head relative to a reference coordinate system; for each microphone of a microphone array of two or more microphones monitoring the physical environment: receiving audio data captured by that microphone, and transforming the audio data captured by that microphone to obtain a frequency domain representation of the audio data that is discretized in a plurality of frequency intervals; providing input data to a previously-trained, audio source localization classifier, the input data including: the frequency domain representation of the audio data captured by each microphone of the microphone array, and the positioning of each human face or head captured by each camera of the camera array in which the positioning of each human face or head represents a candidate audio source; and receiving from the audio source localization classifier, based on the input data, an indication of an identified audio source from among the one or more candidate audio sources that is estimated to be the human face or head from which the audio data originated. In this example or any other example disclosed herein, the identified audio source is identified by the audio source localization classifier based on a combination of an estimated confidence identified for each frequency interval of the plurality of frequency intervals of the frequency domain representation. In this example or any other example disclosed herein, the method further comprises attributing the identified audio source to an identity from which the audio data originated. In this example or any other example disclosed herein, the method further comprises. for each human face or head, determining an identity of the human face or head based on the image data by using a previously trained, face identification classifier; wherein attributing the identified audio source to the identity includes associating a data label indicating the identity with the audio data. In this example or any other example disclosed herein, the method further comprises determining an identity of the identified audio source based on the audio data by using a previously trained, voice identification classifier; wherein attributing the identified audio source to the identity includes associating a data label indicating the identity with the audio data. In this example or any other example disclosed herein, attributing the identified audio source to the identity includes storing a data label indicating the identity as metadata of the audio data. In this example or any other example disclosed herein, the method further comprises storing another data label indicating the position and/or the orientation of the positioning of the identified audio source estimated to be the human face or head from which the audio data originated. In this example or any other example disclosed herein, the audio data represents a time interval of an audio data stream captured by each microphone of the microphone array; and the indication of the identified audio source is estimated by the audio source localization classifier for the time interval. In this example or any other example disclosed herein, the method further comprises generating a beamformer configured to remove noise and interference from the audio data by targeting the position and/or orientation of the identified audio source estimated to be the human face or head from which the audio data originated. In this example or any other example disclosed herein, the positioning of each human face or head relative to the reference coordinate system is determined in six degrees-of-freedom, including the position of the human face or head in three degrees-of-freedom and the orientation of the human face or head in three degrees-of-freedom.

In another example of the present disclosure, a computing system comprises: one or more computing devices programmed to: receive image data captured by a camera monitoring a physical environment; determine a positioning of each human face captured by the camera based on the image data, the positioning of each human face including a position and an orientation of that human face relative to a reference coordinate system; receive audio data captured by each microphone of a microphone array of two or more microphones monitoring the physical environment; for each microphone of the microphone array, transform the audio data captured by that microphone to obtain a frequency domain representation of the audio data that is discretized in a plurality of frequency intervals; provide input data to a previously-trained, audio source localization classifier, the input data including: the frequency domain representation of the audio data captured by each microphone of the microphone array, and the positioning of each human face captured by each camera of the camera array in which the positioning of each human face represents a candidate audio source; and receive from the audio source localization classifier, based on the input data, an indication of an identified audio source from among the one or more candidate audio sources that is estimated to be the human face from which the audio data originated. In this example or any other example disclosed herein, the camera is one of a plurality of cameras of a camera array monitoring the physical environment; and for each camera of the camera array, the input data further includes the positioning of each human face captured by each camera of the camera array in which the positioning of each human face represents a candidate audio source. In this example or any other example disclosed herein, the one or more computing devices are further programmed to: attribute the identified audio source to an identity from which the audio data originated. In this example or any other example disclosed herein, the one or more computing devices are further programmed to: for each human face, determine an identity of the human face based on the image data by using a previously trained, face identification classifier; and the identified audio source is attributed to the identity by associating a data label indicating the identity with the audio data. In this example or any other example disclosed herein, the one or more computing devices are further programmed to: determine an identity of the identified audio source based on the audio data by using a previously trained, voice identification classifier; and the identified audio source is attributed to the identity by associating a data label indicating the identity with the audio data. In this example or any other example disclosed herein, the one or more computing devices are further programmed to: attribute the identified audio source to the identity by storing a data label indicating the identity as metadata of the audio data. In this example or any other example disclosed herein, the audio data represents a time interval of an audio data stream captured by each microphone of the microphone array; and the indication of the identified audio source is estimated by the audio source localization classifier for the time interval. In this example or any other example disclosed herein, the one or more computing devices are further programmed to: generate a beamformer configured to remove noise and interference from the audio data by targeting the position and/or orientation of the identified audio source estimated to be the human face from which the audio data originated. In this example or any other example disclosed herein, the computing system further comprises the microphone array and the camera contained within an enclosure with at least one computing device of the computing system.

In another example of the present disclosure, an article comprises: a data storage device having instructions stored thereon executable by one or more computing devices to: receive image data captured by two or more cameras of a camera array monitoring a physical environment; determine a positioning of each human face or head captured by the camera array based on the image data, the positioning of each human face or head including a position and an orientation of that human face or head relative to a reference coordinate system; receive audio data representing a time interval of an audio data stream captured by each microphone of a microphone array of two or more microphones monitoring the physical environment; for each microphone of the microphone array, transform the audio data captured by that microphone to obtain a frequency domain representation of the audio data that is discretized in a plurality of frequency intervals; provide input data to a previously-trained, audio source localization classifier of the instructions, the input data including: the frequency domain representation of the audio data captured by each microphone of the microphone array, and the positioning of each human face or head captured by each camera of the camera array in which the positioning of each human face or head represents a candidate audio source; receive from the audio source localization classifier, based on the input data, an indication of an identified audio source from among the one or more candidate audio sources that is estimated to be the human face or head from which the audio data originated for the time interval; and attribute the identified audio source to an identity from which the audio data originated by storing a data label indicating the identity as metadata of the audio data.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system, the method comprising:
   for each camera of a camera array of one or more cameras monitoring a physical environment:
      receiving image data captured by that camera, and
      determining a positioning of each human face captured by that camera based on the image data, the positioning of each human face including a position and an orientation of that human face relative to a reference coordinate system;
   for each microphone of a microphone array of two or more microphones monitoring the physical environment:
      receiving audio data captured by that microphone, and
      sampling the audio data captured by that microphone to obtain discrete-time audio data, transforming the discrete-time audio data to obtain a frequency domain representation of the audio data that is discretized in a plurality of frequency intervals, each frequency interval of the plurality of frequency intervals defining a respective frequency band of the audio data;
   providing input data to a previously-trained, audio source localization classifier, the input data including:
      the plurality of frequency intervals in the frequency domain representation of the audio data captured by each microphone of the microphone array, and
      the positioning of each human face captured by each camera of the camera array in which the positioning of each human face represents a candidate audio source; and
   receiving from the audio source localization classifier, based on the input data, an indication of an identified audio source from among the one or more candidate audio sources that is estimated to be the human face from which the audio data originated.

2. The method of claim 1, wherein the identified audio source is identified by the audio source localization classifier based on a combination of an estimated confidence identified for each frequency interval of the plurality of frequency intervals of the frequency domain representation.

3. The method of claim 1, further comprising:
   attributing the identified audio source to an identity from which the audio data originated.

4. The method of claim 3, further comprising:
   for each human face, determining an identity of the human face based on the image data by using a previously trained, face identification classifier; and
   wherein attributing the identified audio source to the identity includes associating a data label indicating the identity with the audio data.

5. The method of claim 3, further comprising:
   determining an identity of the identified audio source based on the audio data by using a previously trained, voice identification classifier; and wherein attributing the identified audio source to the identity includes associating a data label indicating the identity with the audio data.

6. The method of claim 3, wherein attributing the identified audio source to the identity includes storing a data label indicating the identity as metadata of the audio data.

7. The method of claim 6, further comprising:
storing another data label indicating the position and/or the orientation of the positioning of the identified audio source estimated to be the human face from which the audio data originated.

8. The method of claim 1, wherein the audio data represents a time interval of an audio data stream captured by each microphone of the microphone array;
wherein the indication of the identified audio source is estimated by the audio source localization classifier for the time interval; and
wherein the audio source localization classifier was previously trained using the plurality of frequency intervals with respect to training audio data.

9. The method of claim 1, further comprising:
generating a beamformer configured to remove noise and interference from the audio data by targeting the position and/or orientation of the identified audio source estimated to be the human face from which the audio data originated.

10. The method of claim 1, wherein the positioning of each human face relative to the reference coordinate system is determined in six degrees-of-freedom, including the position of the human face or head in three degrees-of-freedom and the orientation of the human face or head in three degrees-of-freedom.

11. A computing system, comprising:
one or more computing devices programmed to:
receive image data captured by a camera monitoring a physical environment;
determine a positioning of each human face captured by the camera based on the image data, the positioning of each human face including a position and an orientation of that human face relative to a reference coordinate system;
receive audio data captured by each microphone of a microphone array of two or more microphones monitoring the physical environment;
for each microphone of the microphone array, sample the audio data captured by that microphone to obtain a discrete-time audio data, transform the discrete-time audio data to obtain a frequency domain representation of the audio data that is discretized in a plurality of frequency intervals, each frequency interval of the plurality of frequency intervals defining a respective frequency band of the audio data;
provide input data to a previously-trained, audio source localization classifier, the input data including:
the plurality of frequency intervals in the frequency domain representation of the audio data captured by each microphone of the microphone array, and
the positioning of each human face captured by each camera of the camera array in which the positioning of each human face represents a candidate audio source; and
receive from the audio source localization classifier, based on the input data, an indication of an identified audio source from among the one or more candidate audio sources that is estimated to be the human face from which the audio data originated.

12. The computing system of claim 11, wherein the camera is one of a plurality of cameras of a camera array monitoring the physical environment; and
wherein for each camera of the camera array, the input data further includes the positioning of each human face captured by each camera of the camera array in which the positioning of each human face represents a candidate audio source.

13. The computing system of claim 11, wherein the one or more computing devices are further programmed to:
attribute the identified audio source to an identity from which the audio data originated.

14. The computing system of claim 13, wherein the one or more computing devices are further programmed to:
for each human face, determine an identity of the human face based on the image data by using a previously trained, face identification classifier; and
wherein the identified audio source is attributed to the identity by associating a data label indicating the identity with the audio data.

15. The computing system of claim 13, wherein the one or more computing devices are further programmed to:
determine an identity of the identified audio source based on the audio data by using a previously trained, voice identification classifier; and
wherein the identified audio source is attributed to the identity by associating a data label indicating the identity with the audio data.

16. The computing system of claim 13, wherein the one or more computing devices are further programmed to:
attribute the identified audio source to the identity by storing a data label indicating the identity as metadata of the audio data.

17. The computing system of claim 11, wherein the audio data represents a time interval of an audio data stream captured by each microphone of the microphone array;
wherein the indication of the identified audio source is estimated by the audio source localization classifier for the time interval; and
wherein the audio source localization classifier was previously trained using the plurality of frequency intervals with respect to training audio data.

18. The computing system of claim 11, wherein the one or more computing devices are further programmed to:
generate a beamformer configured to remove noise and interference from the audio data by targeting the position and/or orientation of the identified audio source estimated to be the human face from which the audio data originated.

19. The computing system of claim 11, further comprising the microphone array and the camera contained within an enclosure with at least one computing device of the computing system.

20. An article, comprising:
a data storage device having instructions stored thereon executable by one or more computing devices to:
receive image data captured by two or more cameras of a camera array monitoring a physical environment;
determine a positioning of each human face or head captured by the camera array based on the image data, the positioning of each human face or head including a position and an orientation of that human face or head relative to a reference coordinate system;
receive audio data representing a time interval of an audio data stream captured by each microphone of a microphone array of two or more microphones monitoring the physical environment;

each microphone of the microphone array, sample the audio data captured by that microphone to obtain a discrete-time audio data, transform the discrete-time audio data to obtain a frequency domain representation of the audio data that is discretized in a plurality of frequency intervals, each frequency interval of the plurality of frequency intervals defining a respective frequency band of the audio data;

provide input data to a previously-trained, audio source localization classifier of the instructions, the input data including:

the plurality of frequency intervals in the frequency domain representation of the audio data captured by each microphone of the microphone array, and the positioning of each human face or head captured by each camera of the camera array in which the positioning of each human face or head represents a candidate audio source;

receive from the audio source localization classifier, based on the input data, an indication of an identified audio source from among the one or more candidate audio sources that is estimated to be the human face or head from which the audio data originated for the time interval; and attribute the identified audio source to an identity from which the audio data originated by storing a data label indicating the identity as metadata of the audio data.

* * * * *